(12) United States Patent
Chen et al.

(10) Patent No.: US 10,776,159 B2
(45) Date of Patent: Sep. 15, 2020

(54) DISTRIBUTED STORAGE-BASED FILED DELIVERY SYSTEM AND METHOD USING CALCULATED DEPENDENCIES BETWEEN TASKS TO ENSURE CONSISTANCY OF FILES

(71) Applicant: WANGSU SCIENCE & TECHNOLOGY CO., LTD., Shanghai (CN)

(72) Inventors: Liang Chen, Shanghai (CN); Gengxin Lin, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 190 days.

(21) Appl. No.: 15/759,047

(22) PCT Filed: Sep. 11, 2016

(86) PCT No.: PCT/CN2016/098652
§ 371 (c)(1),
(2) Date: Mar. 9, 2018

(87) PCT Pub. No.: WO2017/050141
PCT Pub. Date: Mar. 30, 2017

(65) Prior Publication Data
US 2019/0042303 A1 Feb. 7, 2019

(30) Foreign Application Priority Data
Sep. 24, 2015 (CN) .......................... 2015 1 0616269

(51) Int. Cl.
*G06F 9/48* (2006.01)
*G06F 16/182* (2019.01)
(Continued)

(52) U.S. Cl.
CPC ............ *G06F 9/4881* (2013.01); *G06F 9/505* (2013.01); *G06F 16/182* (2019.01);
(Continued)

(58) Field of Classification Search
CPC ...... G06F 9/4881; G06F 9/505; G06F 16/182; G06F 16/184; G06F 2209/505; H04L 29/08; H04L 67/1097; H04L 67/1002
See application file for complete search history.

(56) References Cited

U.S. PATENT DOCUMENTS 6,112,243 A * 8/2000 Downs .................. G06F 9/5044
709/219
8,782,744 B1 * 7/2014 Fuller ..................... G06F 21/52
709/225
(Continued)

FOREIGN PATENT DOCUMENTS

CN 101193294 A 6/2008
CN 102075358 A 5/2011
(Continued)

OTHER PUBLICATIONS

The European Patent Office (EPO) the extended European search report for 16848023.4 dated May 14, 2018 8 Pages.

*Primary Examiner* — Meng Ai T An
*Assistant Examiner* — Michael W Ayers
(74) *Attorney, Agent, or Firm* — Anova Law Group, PLLC

(57) ABSTRACT

A distributed storage-based file delivery system and a distributed storage-based file delivery method are provided. The system comprises: a scheduling server; at least one source group, where each source group include a plurality of distributed file storage clusters, and each distributed file storage cluster include a plurality of data nodes. The scheduling server is configured to, according to operators of the distributed file storage clusters and load information of each (Continued)

data node, perform task scheduling based on a received task, and generate task instructions, where the task is received from a client or a data node. The data nodes to which the task instructions are directed are configured to execute the task and/or perform task distribution according to the task instructions, such that data within all distributed file storage clusters in a same source group remains synchronized.

17 Claims, 14 Drawing Sheets

(51) Int. Cl.
 G06F 9/50 (2006.01)
 H04L 29/08 (2006.01)
(52) U.S. Cl.
 CPC ............ *G06F 16/184* (2019.01); *H04L 29/08* (2013.01); *H04L 67/1097* (2013.01); *G06F 2209/505* (2013.01)

(56) References Cited

U.S. PATENT DOCUMENTS

| | | | | |
|---|---|---|---|---|
| 8,924,511 B2* | 12/2014 | Brand | ................ | H04L 67/1097 709/218 |
| 9,183,049 B1* | 11/2015 | Corley | ..................... | G06F 9/48 |
| 9,195,443 B2* | 11/2015 | Kuesel | ................... | G06F 8/443 |
| 2002/0091784 A1* | 7/2002 | Baker | ................... | G05B 19/05 709/208 |
| 2003/0084350 A1* | 5/2003 | Eibach | ................... | H04L 63/08 726/4 |
| 2007/0083662 A1* | 4/2007 | Adams | ............... | H04L 41/0896 709/229 |
| 2010/0186020 A1* | 7/2010 | Maddhirala | ........... | G06F 9/5038 718/105 |
| 2011/0283016 A1* | 11/2011 | Uchida | ................. | H04L 47/125 709/235 |
| 2011/0321051 A1* | 12/2011 | Rastogi | ................ | G06F 9/4881 718/102 |
| 2013/0179542 A1 | 7/2013 | Wang et al. | | |
| 2015/0271299 A1* | 9/2015 | Bullotta | .................. | G06F 16/00 709/230 |
| 2016/0085587 A1* | 3/2016 | Dube | ................... | G06F 9/5011 718/104 |

FOREIGN PATENT DOCUMENTS

| | | |
|---|---|---|
| CN | 103002274 A | 3/2013 |
| CN | 103391312 A | 11/2013 |
| CN | 104834722 A | 8/2015 |
| CN | 105162878 A | 12/2015 |
| EP | 3296870 A1 | 3/2018 |

* cited by examiner

DISTRIBUTED STORAGE-BASED FILED DELIVERY SYSTEM AND METHOD USING CALCULATED DEPENDENCIES BETWEEN TASKS TO ENSURE CONSISTANCY OF FILES

CROSS-REFERENCES TO RELATED APPLICATIONS

This application is a national phase entry under 35 U.S.C § 371 of International Application No. PCT/CN2016/098652, filed on Sep. 11, 2016, which claims priority of Chinese Patent Application No. 201510616269.7, filed with the State Intellectual Property Office of P. R. China on Sep. 24, 2015, the entire contents of all of which are incorporated herein by reference.

FIELD OF THE DISCLOSURE

The present disclosure generally relates to management technology of distributed file storage and, more particularly, relates to a distributed storage-based file delivery system and a method thereof.

BACKGROUND

Currently, with the rapid development of the Internet industry and Internet technology, a lot of rich media has been continuously produced on the Internet. The rich media can include audio, pictures, video, and other media information. In response to the demanding of the rich media, more and more Internet websites need to be accelerated by using content delivery network (CDN).

A CDN normally contains a source server (also known as a source station), and multiple caching servers (also known as node servers), where the caching servers are used for caching data. When a user visits a resource, the user can be preferentially directed to the nearest caching server to obtain the resource to improve the response speed. If the caching servers do not cache the required resource, a return-to-source request can be sent to obtain the corresponding resource from the source server. However, a large number of concurrent return-to-source requests in the CDN can generate a significant strain on the source station. Therefore, CDN operators typically provide additional storage as a return-to-source alternative solution in order to reduce the cost of data storage and the pressure of return-to-source for the source station.

However, the return-to-source alternative solution in the existing techniques has the following disadvantages:

(1) For cross-operator, and/or cross-room storage application scenarios, it cannot provide efficient file distribution solutions.

(2) For the various types of rich media, it does not provide post-processing functions, such as image format conversion, image thumbnail, video transcoding, format conversion, video slicing, and live stream playback.

(3) It cannot support customer diversified access methods, such as file transfer protocol (FTP), remote sync (Rsync), hypertext transfer protocol (HTTP), and custom application programming interface (API).

BRIEF SUMMARY OF THE DISCLOSURE

In accordance with some embodiments of the invention, a distributed storage-based file delivery system and a distributed storage-based file delivery method are provided.

The task scheduling of multiple distributed file storage clusters can be performed by using a scheduling server, which can effectively improve the file distribution efficiency among multiple distributed file storage clusters.

In order to solve the technical problems set forth above, the present disclosure provides a distributed storage-based file delivery system, comprising: a scheduling server; at least one source group, wherein each source group includes a plurality of distributed file storage clusters, and each distributed file storage cluster includes a plurality of data nodes. The scheduling server is configured to, based on received a task and according to operators of the distributed file storage clusters and load information of each data node, perform task scheduling and generate task instructions, where the task may be sent by a client or a data node. The data nodes to which the task instructions are directed are configured to execute the task and/or perform task distribution according to the task instructions, such that data within all distributed file storage clusters in a same source group remains synchronized.

In one embodiment of the present disclosure, the scheduling server includes: an application program interface (API) module configured for receiving and parsing the task; a load balancing module configured for collecting load information of the data nodes in all distributed file storage clusters; a task scheduling module configured for obtaining the task from the API module, and selecting qualified data nodes from the plurality of data nodes based on the operators of the distributed file storage clusters and the load information of each data node, to execute the task and/or perform the task distribution, and generate the task instructions; and an instruction transmission module configured for transmitting the task instructions generated by the task scheduling module to the selected data nodes.

In one embodiment of the present disclosure, the task scheduling module includes: a determination sub-module configured for determining whether the task is able to be executed and/or distributed according to the operators of the distributed file storage clusters and the load information of the plurality of data nodes; a first selection sub-module configured for selecting a data node to perform the task according to the load information if the task is able to be executed; a second selection sub-module configured for, based on the operators of the data nodes, the load information of the data nodes, and task operation history records of the data nodes, selecting a file transmission path if the task is able to be distributed, wherein the file transmission path includes a set of data nodes for task distribution and a transmission order between each data node; and an instruction generation sub-module configured for generating the task instructions according to output results of the first selection sub-module and the second selection sub-module.

In one embodiment of the present disclosure, the second selection sub-module is further configured for, based on the operators of the data nodes, instructing a plurality of data nodes on the transmission path to select different transmission protocols for data transmission, thereby optimizing the transmission efficiency.

In one embodiment of the present disclosure, the API module includes: a dynamic API module configured for adapting a client-customized dynamic API; and a release API module configured for: receiving and validating the task, determining whether to enable the dynamic API, in response to the dynamic API being not enabled, parsing the task directly, and in response to the dynamic API being enabled, using the API module to parse the task.

In one embodiment of the present disclosure, the scheduling server further includes at least one of the following modules: a task pre-processing module configured for filtering repeated tasks before the task scheduling module obtains the task; a task lifecycle management module configured for managing a life cycle of the task, calculating an execution progress of the task, and/or performing time-out management on execution of the task; a dynamic feedback module configured for feeding back a completion result of the task; and a failure recovery module configured for providing failure recovery for a plurality of distributed file storage clusters within a same source group.

In one embodiment of the present disclosure, the task pre-processing module is further configured for calculating dependencies between different tasks; and the task scheduling module is further configured for performing task scheduling according to the dependencies between different tasks.

In one embodiment of the present disclosure, the task pre-processing module calculates the dependencies between different tasks using a following approach: determining a lock status of a parent path of a target file or a target directory that is to be operated on by a current task, if a directory of the parent path has a write lock, adding all tasks that operate on the directory to a dependent queen of the current task; determining a lock status of the target file or the target directory that is to be operated on by the current task, if the target file or the target directory has a write lock, adding all tasks that operate on the target file or the target directory to the dependent queen of the current task; performing a locking operation on the target file or the target directory that is to be operated on by the current task, and after the current task is completed, performing an unlocking operation on the target file or the target directory. The locking operation includes: for all parent directories of the target file or the target directory to which the locking operation is directed, incrementing corresponding read lock indexes by 1, and for the target file or the target directory, incrementing a corresponding write lock index by 1. The unlocking operation includes: for all parent directories of the target file or the target directory to which the unlocking operation is directed, decrementing corresponding read lock indexes by 1, and for the target file or the target directory, decrementing a corresponding write lock index by 1.

In one embodiment of the present disclosure, each data node is configured with a file delivery client, wherein the file delivery client includes: a protocol processing module configured for receiving and parsing the task instructions sent by the scheduling server to obtain the task; a task execution module configured for acquiring the task from the protocol processing module and executing the task according to a type of the task; and a task feedback module configured for feeding back an execution progress and/or an execution result of the task to the scheduling server.

In one embodiment of the present disclosure, the type of the task includes: uploading, deleting, copying, transcoding, decompressing, slicing, image processing, renaming, creating a directory, Rsync task, video format conversion, and file verification.

In one embodiment of the present disclosure, each data node is configured with a file transfer protocol (FTP) server, wherein the FTP server includes: an FTP module configured for providing a generic FTP service; an FTP event encapsulation module configured for encapsulating and generating the task based on a monitored FTP event; and a task submission module configured for transmitting the task generated by the FTP event encapsulation module to the scheduling server.

In one embodiment of the present disclosure, each data node is configured with an Rsync server, wherein the Rsync server includes: an Rsync module configured for providing a generic Rsync service; an Rsync event encapsulation module configured for encapsulating and generating the task based on a monitored Rsync event; and a task submission module configured for transmitting the task generated by the Rsync event encapsulation module to the scheduling server.

In order to solve the problems set forth above, the present disclosure further provides a distributed storage-based file delivery method, comprising: based on a received task and according to operators of distributed file storage clusters and load information of each data node, performing, by a scheduling server, task scheduling, and generating, by the scheduling server, task instructions, where the task is sent by a client or a data node; according to the task instructions, executing, by the data nodes to which the task instructions are directed, the task and/or performing, by the data nodes to which the task instructions are directed, task distribution, such that data within all distributed file storage clusters in a same source group remains synchronized. The source group includes a plurality of distributed file storage clusters, and each distributed file storage cluster include a plurality of data nodes.

In one embodiment of the present disclosure, according to operators of distributed file storage clusters and load information of each data node, performing task scheduling and generating task instructions includes: receiving and parsing the task; collecting load information of the data nodes in all distributed file storage clusters; selecting qualified data nodes from the plurality of data nodes based on the operators of the distributed file storage clusters and the load information of the plurality of data nodes, to execute the task and/or perform the task distribution, and generating the task instructions; and transmitting the task instructions to the selected data nodes.

In one embodiment of the present disclosure, selecting the qualified data nodes from the plurality of data nodes to execute the task and/or perform the task distribution includes: determining whether the task can be executed and/or distributed according to the operators of the distributed file storage clusters and the load information of the plurality of data nodes; selecting a data node to perform the task according to the load information if the task can be executed; based on the operators of distributed file storage clusters, the load information of the data nodes, and task operation history records of the data nodes, selecting a file transmission path if a task can be distributed, wherein the file transmission path include a set of data nodes for task distribution and a transmission order between each data node; and generating the task instructions.

In one embodiment of the present disclosure, selecting the qualified data nodes from the plurality of data nodes to execute the task and/or perform the task distribution further includes: based on the operators of the distributed file storage clusters, instructing a plurality of data nodes on the transmission path to select different transmission protocols for data transmission, thereby optimizing the transmission efficiency.

In one embodiment of the present disclosure, receiving and parsing the task includes: configuring a dynamic API module for adapting a client-customized dynamic API; receiving and validating the task; determining whether to enable the dynamic API; if the dynamic API is not enabled, parsing the task directly; and if the dynamic API is enabled, using the dynamic API module to parse the task.

In one embodiment of the present disclosure, according to operators of distributed file storage clusters and load information of each data node, performing task scheduling and generating task instructions further includes one or more of following steps: filtering repeated tasks before the task scheduling module obtains the task; managing a life cycle of the task, calculating an execution progress of the task, and/or performing time-out management on execution of the task; feeding back a completion result of the task; and providing failure recovery for the plurality of distributed file storage clusters within the same source group.

In one embodiment of the present disclosure, according to operators of distributed file storage clusters and load information of each data node, performing task scheduling and generating task instructions further include: calculating dependencies between different tasks; and performing, by the task scheduling module, task scheduling according to the dependencies between different tasks.

In one embodiment of the present disclosure, dependencies between different tasks can be determined using a following approach: determining a lock status of a parent path of a target file or a target directory that is to be operated on by a current task, if a directory of the parent path has a write lock, adding all tasks that operate on the directory to a dependent queue of the current task; determining a lock status of the target file or the target directory that is to be operated on by the current task, if the target file or the target directory has a write lock index, adding all tasks that operate on the target file or the target directory to the dependent queue of the current task; performing a locking operation on the target file or the target directory that is to be operated on by the current task; and after the current task is completed, performing an unlocking operation on the target file or the target directory. The locking operation includes: for all parent directories of the target file or the target directory to which the locking operation is directed, incrementing corresponding read lock indexes by 1, and for the target file or the target directory, incrementing a corresponding write lock index by 1. The unlocking operation includes: for all parent directories of the target file or the target directory to which the unlocking operation is directed, decrementing corresponding read lock indexes by 1, and for the target file or the target directory, decrementing a corresponding write lock index by 1.

In one embodiment of the present disclosure, executing, by the data nodes to which the task instructions are directed, the task and/or performing, by the data nodes to which the task instructions are directed, the task distribution includes: receiving and parsing the task instructions sent by the scheduling server to obtain the task; executing the task according to a type of the task; and feeding back an execution progress and/or an execution result of the task to the scheduling server.

In one embodiment of the present disclosure, the type of the task includes: uploading, deleting, copying, transcoding, decompressing, slicing, image processing, renaming, creating a directory, Rsync task, video format conversion, and file verification.

Comparing to the existing techniques, the present invention has the following advantages.

The disclosed file delivery system uses a scheduling server to schedule tasks according to operators of the distributed file storage clusters and load information of each data node. As such, physical resources inside the distributed file storage clusters can be fully employed, and the efficiency of file distribution among a plurality of distributed file storage clusters can be improved.

Additionally, the disclosed file delivery system can use a file locking mechanism. In the cases where multiple tasks are concurrently existing, the consistency of the files can be ensured.

Further, the disclosed file delivery system would configure a file delivery client at each data node. As such, depending on different task types, different post-processing functions such as picture format conversion, picture thumbnail, video transcoding, video format conversion, video slicing, and live stream playback, can be provided to meet the diverse document processing needs of clients.

In addition, in the disclosed file delivery system, the scheduling server can configure a dynamic API customized by the client, so that the access of the client-customized API does not need to be upgraded and redeployed.

DETAILED DESCRIPTION

The invention will be described in details hereinafter with reference to various embodiments and accompanying drawings, which should not be treated as limiting of the scopes of the invention.

Figure 1:
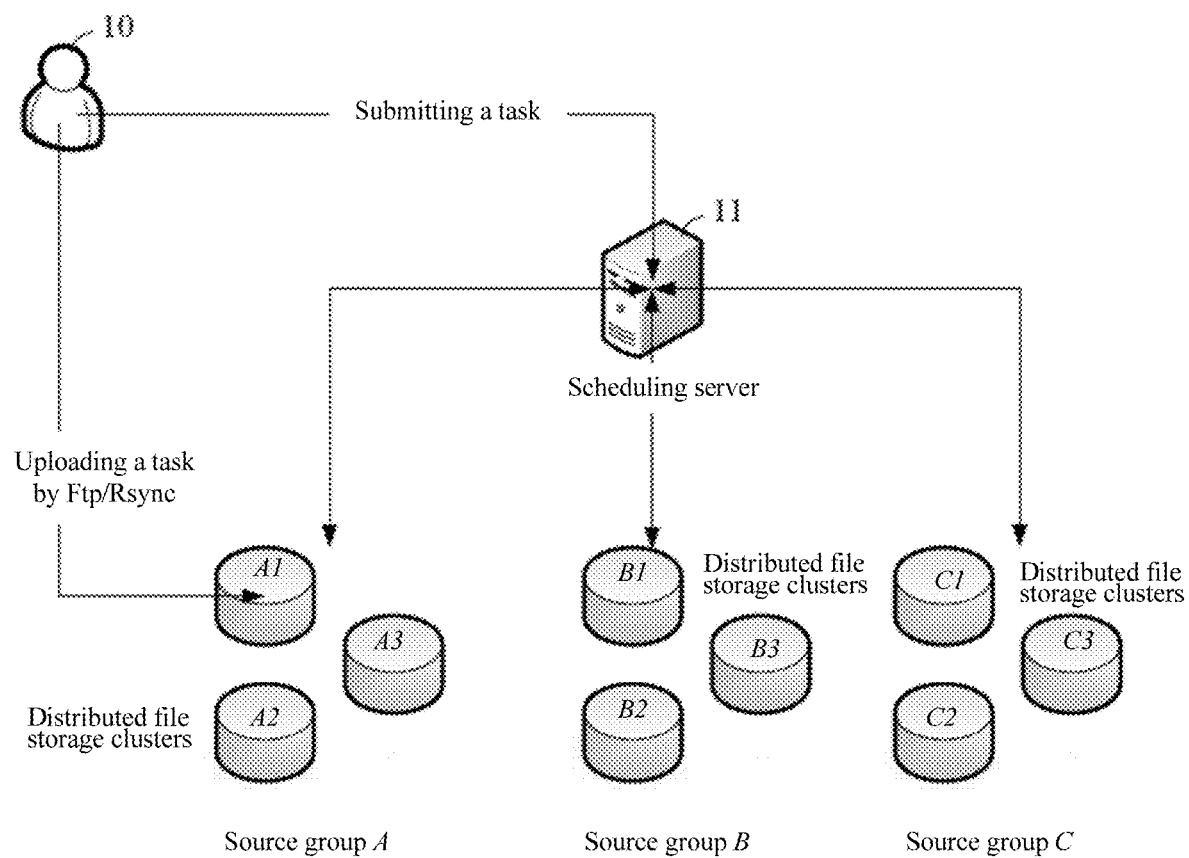
FIG. 1 illustrates a schematic structural diagram showing an overall configuration of an exemplary distributed storage-based file delivery system in accordance with some embodiments of the present disclosure.

Referring to FIG. 1, a distributed storage-based file delivery system may include a scheduling server 11, and one or more source groups, such as a source group A, a source group B, and a source group C. The present disclosure is not limited thereto. In addition, the file delivery system may also include a database (not shown in the figures), such as a MySQL database.

Each source group can include multiple distributed file storage clusters, which can also be referred as "clusters". For example, the source group A can include the distributed file storage clusters A1 to A3, the source group B can include the distributed file storage clusters B1 to B3, and the source group C can include the distributed file storage clusters C1 to C3.

The data of the multiple distributed file storage clusters within the same source group can remain synchronized. Each distributed file storage cluster may include multiple data nodes, and each data node may be a separate computer or a hardware server. The individual data nodes in a single distributed file storage cluster may share a same storage component. In other words, the data in the storage component is shared by multiple data nodes within the cluster.

In general, multiple data nodes in a single distributed file storage cluster can belong to a same operator or several same operators. Different distributed file storage clusters within a same source group can belong to the same or different operators. In addition, multiple data nodes in a single distributed file storage cluster can typically reside in a same room.

In some embodiments, each of the distributed file storage clusters can be independent from each other, and the scheduling server 11 may perform task scheduling to coordinate file synchronization.

In some embodiments, a file delivery client, a FTP server, an Rsync server may be configured on the data node. The aforementioned file delivery client, FTP server, and Rsync server may be software programs running on the data node, a combination of software and hardware, or may be implemented in other suitable manners. In addition, the data node may be configured with other servers or protocol modules used for data transmission, such as servers or protocol modules used for supporting UDP or Http transmission. The file delivery client, FTP server, and Rsync server are described in detail below.

Further, the scheduling server 11 may receive tasks from a client 10 or a data node. For example, the client 10 may send a task to the scheduling server 11 through a generic or custom application program interface (API). Based on the received task(s), the scheduling server 11 can perform task scheduling based on the operators of each distributed file storage cluster and the load information of each data node. The scheduling server 11 can send a result of task scheduling to the corresponding distributed file storage clusters and data nodes through a manner of task instructions.

The client 10 can upload files to a data node through a variety of different transmission modes. For example, a FTP or Rsync mode can be used to upload files to a data node of a distributed file storage cluster with a specified domain name. The data node may send a task to the scheduling server 11 based on such a file upload event. Further, the scheduling server 11 can perform task scheduling, perform task distributing in multiple distributed file storage clusters within a same source group, and transmit the user-uploaded file to other distributed file storage clusters, so that the data in multiple distributed file storage clusters can remain synchronized.

Database can be used to store service configuration information, task data, and real-time status of data nodes in all distributed file storage clusters.

Figure 2:
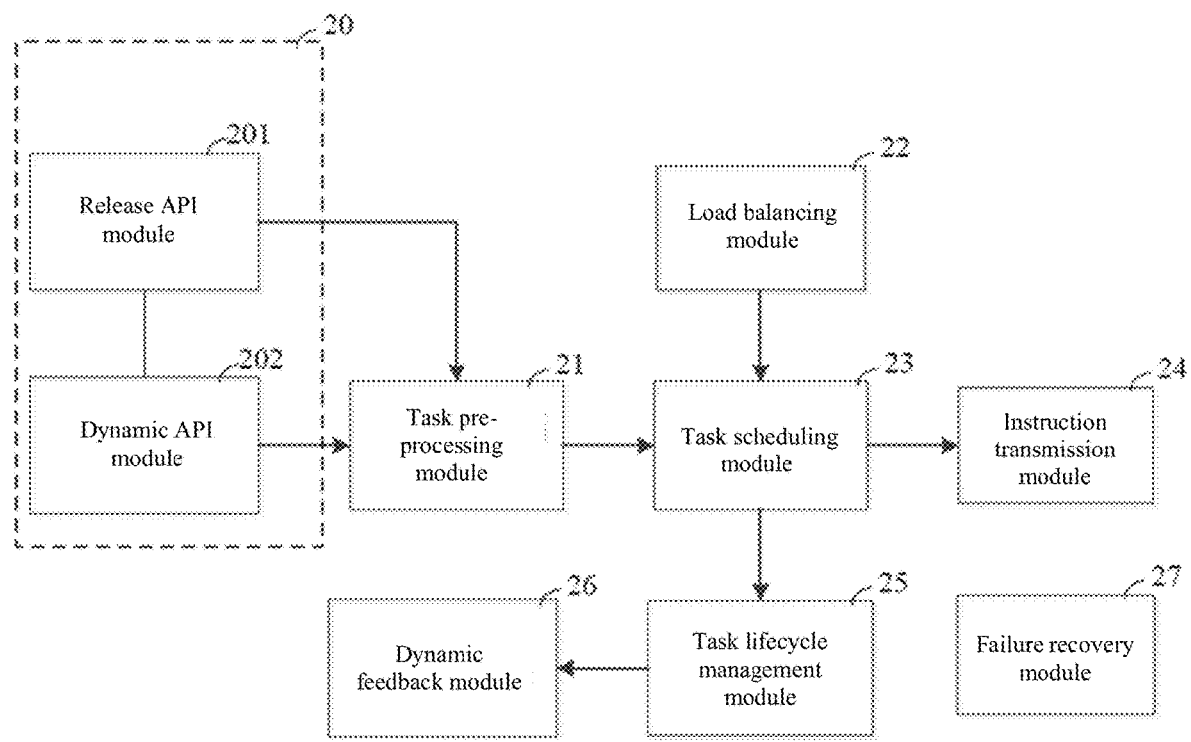
FIG. 2 illustrates a structural block diagram of an exemplary scheduling server in a file delivery system in accordance with some embodiments of the present disclosure.

Referring to FIG. 2, the disclosed scheduling server may include an API module 20, a task pre-processing module 21, a load balancing module 22, a task scheduling module 23, an instruction transmission module 24, a task lifecycle management module 25, a dynamic feedback module 26, and a failure recovery module 27.

The API module 20 can be used for receiving and analyzing tasks. As one example, the API module 20 may include a release API module 201 and a dynamic API module 202.

Further, the dynamic API module 202 can be used to adapt the client-customized dynamic API. The dynamic API module 202 can adapt client-customized dynamic APIs on-line based on various template languages (e.g., Velocity) and/or dynamic languages (e.g., Groovy) without deployment and upgrade. It should be noted that Groovy is an agile dynamic language used for the Java Virtual Machine, and is a mature object-oriented programming language that can be used for object-oriented programming and as a pure scripting language. By using Groovy, not only verbose code can be avoided, but also other features in the closures and dynamic languages can be included. Velocity is a java-based template engine that allows anyone to reference objects defined by java code using just a simple template language.

The release API module 201 can be used to receive and validate tasks, and to determine whether to enable the dynamic API. For example, the release API module 201 can determine whether to enable the dynamic API according to the client configuration. By default, the dynamic API is not enabled, while a generic API is enabled. If the dynamic API is not enabled, the release API module 201 can directly parse the tasks and encapsulate the task objects. If the dynamic API is enabled, the dynamic API module 202 can parse the tasks and encapsulate the task objects, and then transfer the task objects to the release API module or directly transfer the parsed tasks to the release API module 201 as task objects. In addition, the release API module 201 may store the parsed tasks, and add the tasks to a client task queue.

The task pre-processing module 21 may filter the repeated tasks. For example, the tasks submitted repeatedly by the clients can be filtered. In addition, the task pre-processing module 21 may calculate dependencies between tasks, and may also divide the tasks into groups according to the priority of the tasks. The dependencies between the various tasks will be described in detail below.

The load balancing module 22 can collect the load statuses of data nodes within all distributed file storage clusters. The load statuses may indicate a variety of physical resource constraints including, but not limited to, system load, CPU utilization, disk IO, network bandwidth, and memory. The load balancing module 22 may perform load balancing based on the load statuses to obtain load information. For example, the load balancing can be performed by using a variety of appropriate load balancing algorithms, such as polling, intelligent load scheduling, and weighted polling. As a non-limiting example, the intelligent load scheduling algorithm may be used to perform load balancing. That is, based on the actual load of each data node, an optimal data node e.g., a data node that has the lowest real load, can be selected to provide service, such as executing a task, or performing task distribution.

The task scheduling module 23 can be used for obtaining tasks, such as obtaining tasks from a client task queue, and according to the operator of the distributed file storage clusters and the load information of the plurality of data nodes, the task scheduling module 23 may select the data nodes that satisfy the requirements from a plurality of data nodes to execute tasks and/or to perform task distribution. Further, the task scheduling module 23 may also be used to perform task scheduling according to the dependencies between tasks. The task scheduling module 23 can generate task instructions that include a result of task scheduling.

Still further, the task scheduling module 23 may include: a determination sub-module, used for determining whether the tasks can be executed and/or be distributed based on the operators of distributed file storage clusters and the load information of the multiple data nodes; a first selection sub-module, used for selecting a data node according to the load information to execute a task if the task can be executed; a second selection sub-module, used for, based on the operators of the data nodes, the load information of the data nodes, and the task operation history record of the data nodes, selecting a file transmission path if a task can be distributed, where the file transmission path can include multiple data nodes used for task distribution and a transmission order between the multiple data nodes; and an instruction generation sub-module, used for generating task instructions according to output results of the first selection sub-module and the second selection sub-module.

The instruction transmission module 24 can forward the task instructions to the selected data nodes. For example, the instruction transmission module 24 can send task instructions to a data node using a generic or private protocol based on a result of the task scheduling. More specifically, the task instructions can be sent to the task distribution client on the data node.

The task lifecycle management module 25 can be used for managing the lifecycle of each task, and can also be used for calculating real-time progress of each task, and for task distribution time-out management, and the like.

The dynamic feedback module 26 can be used to feed back the completion results of the tasks, such as execution results or distribution results. Further, the dynamic feedback module 26 can feed back the completion result of the tasks to the client systems or mailboxes. The feedback content can be dynamically configured by using a template engine such as Velocity.

The failure recovery module 27 can be used to provide failure recovery for multiple distributed file storage clusters within a same source group. For example, the tasks of a source group can be queried and merged after a checkpoint, and failure recovery can be performed on the distributed file storage clusters in the source group based on the merged tasks. The contents of the failure recovery will be described in detail below.

Figure 3:
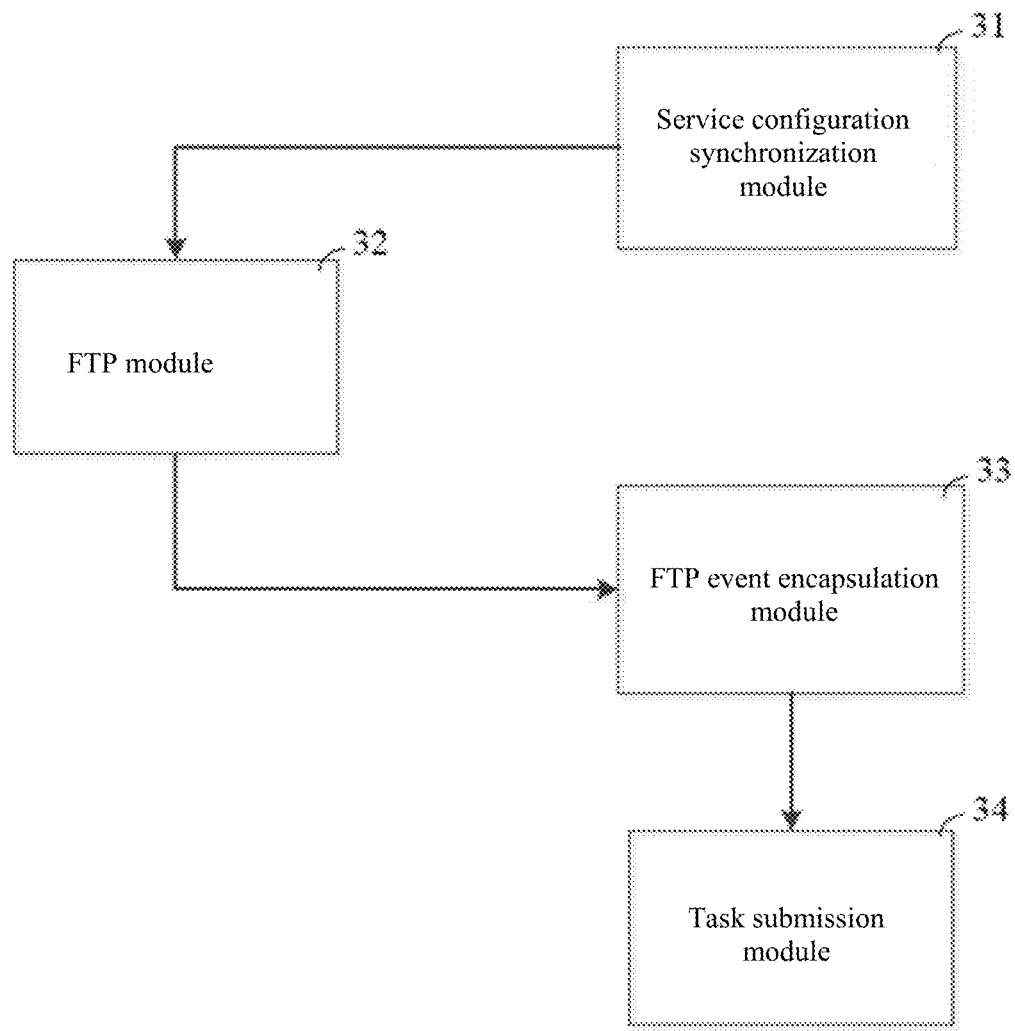
FIG. 3 illustrates a structural block diagram of an exemplary FTP server in a file delivery system in accordance with some embodiments of the present disclosure.

Referring to FIG. 3, FIG. 3 illustrates a structural block diagram of an exemplary FTP server. The FTP server can be configured on each data node. The FTP server may include a service configuration synchronization module 31, an FTP module 32, an FTP event encapsulation module 33, and a task submission module 34.

Further, the service configuration synchronization module 31 is used to synchronize and save the service configuration information. For example, the service configuration synchronization module 31 may, at pre-determined moments, synchronize the service configuration information of the client to the scheduling server and save the service configuration information of the client to the configuration file.

The FTP module 32 can be used to provide generic FTP services. For example, based on the open source Apache FtpServer, extension and encapsulation may be performed to provide a generic FTP protocol function.

The FTP event encapsulation module 33 can be used to encapsulate and generate a task based on a monitored FTP event. For example, the FTP event encapsulation module 33 can monitor FTP events of a client, such as a file uploading by the client based on the FTP protocol. When an FTP event is monitored, a task can be encapsulated and generated, and may further be recorded in a log.

The task submission module 34 can be used to transmit the task generated by the FTP event encapsulation module 33 to the scheduling server. For example, a generated task may be transmitted to the scheduling server by using a generic release API.

Figure 4:
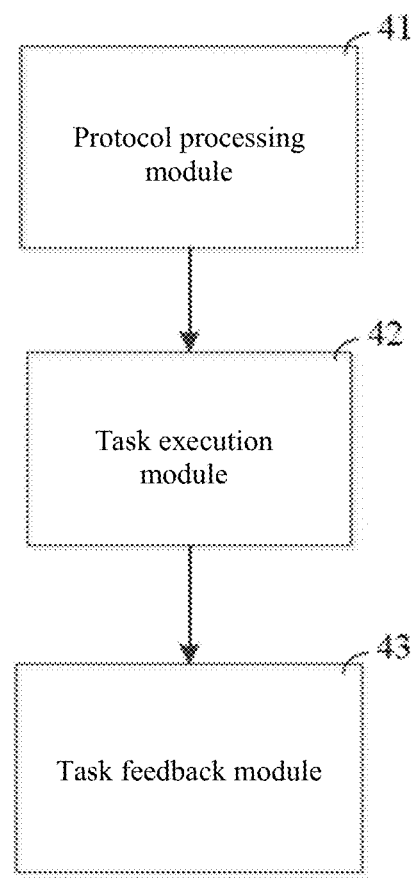
FIG. 4 illustrates a structural block diagram of an exemplary file delivery client in a file delivery system in accordance with some embodiments of the present disclosure.

Referring to FIG. 4, FIG. 4 illustrates a schematic structural block diagram of an exemplary file delivery client in accordance with some embodiments of the present disclosure. The file delivery client can be configured on each data node. The file delivery client may include a protocol processing module 41, a task execution module 42, and a task feedback module 43.

The protocol processing module 41 can be used to receive and parse the task instructions from the scheduling server to obtain the tasks. For example, the protocol processing module 41 may add the parsed tasks to a task queue.

The task execution module 42 can be used to execute a task according to the type of the task. For example, the task execution module 42 may obtain a task from the task queue and determine the type of the task.

If the task is a distribution task, the task execution module 42 can start to download the file from a specified target, and can regularly report the progress of the download to the scheduling server. After the download is completed, the integrity of the file can be verified. For example, message digest 5 (MD5), Secure Hash Algorithm (SHA) or other verification approaches can be used to ensure the consistency of the file.

If the task is a deletion task, the task execution module 42 can delete the file and feedback the results. If the task is a transcoding task, the task execution module 42 can start transcoding, and can regularly feedback a progress of the transcoding. If the task is a decompression task, the task execution module 42 can call a corresponding decompression tool to start decompression. If the task is a slicing task, the task execution module 42 can start to slice and can regular feedback the progress of slicing. If the task is an image processing task, the task execution module 42 can correspondingly process the image and feedback a result of the image processing. If the task is an Rsync task, the task execution module 42 can call corresponding Rsync instructions.

The task feedback module 43 can be used to feed back the execution progress and/or result of the task to the scheduling server.

Figure 5:
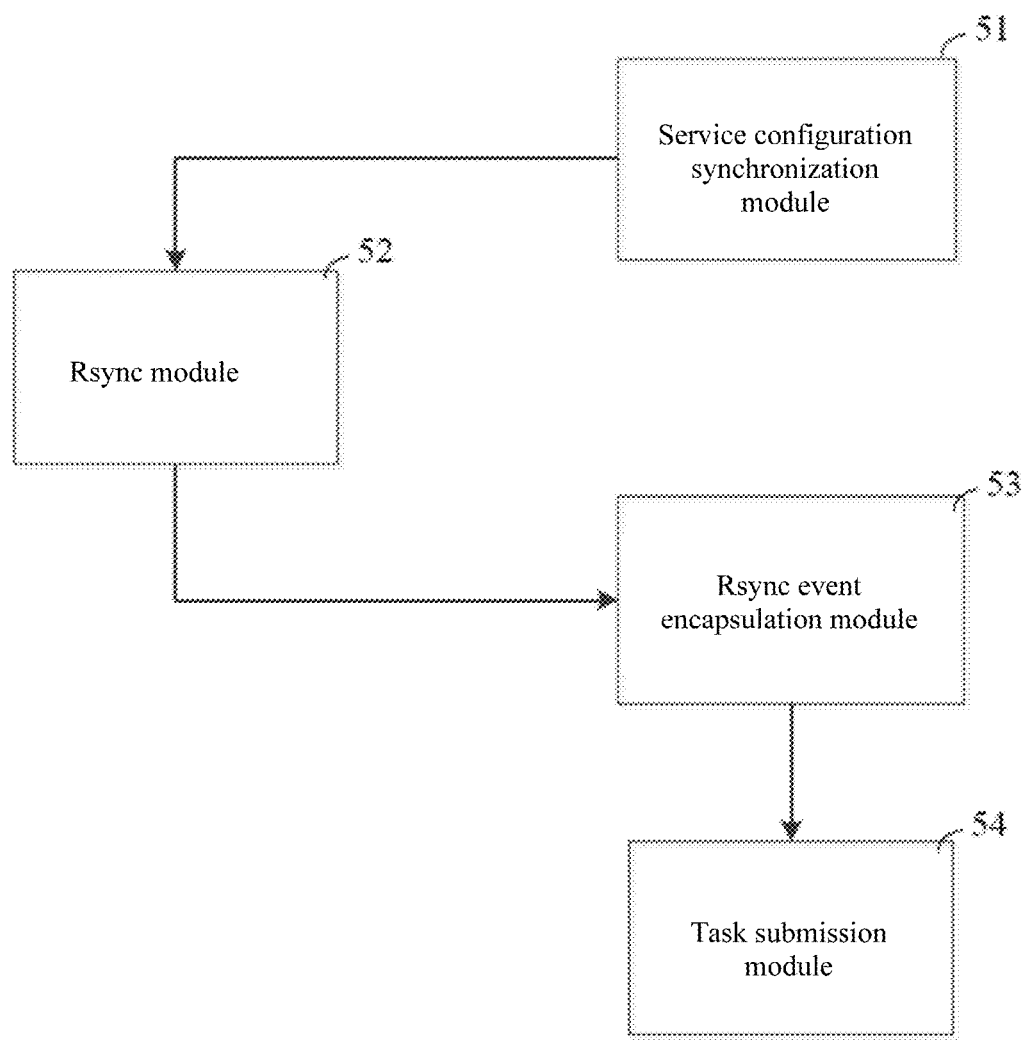
FIG. 5 illustrates a structural block diagram of an exemplary Rsync server in a file delivery system in accordance with some embodiments of the present disclosure.

Referring to FIG. 5, FIG. 5 illustrates a structural block diagram of an exemplary Rsync server in accordance with some embodiments of the present disclosure. The Rsync server can be configured on each data node. The Rsync server may include a service configuration synchronization module 51, an Rsync module 52, an Rsync event encapsulation module 53, and a task submission module 54.

The service configuration synchronization module 51 can be used to synchronize and save service configuration information of the clients. For example, the service configuration synchronization module 51 may regularly synchronize the service configuration information of a client to the scheduling server, and save the service configuration information of the client into an Rsync configuration file.

The Rsync module 52 is used to provide a generic Rsync service. The Rsync module 52 may perform encapsulating based on the Rsync source code under UNIX and provide a generic Rsync service.

It should be noted that, Rsync is a UNIX-like data mirroring backup tool—remote sync. Remote sync is a fast incremental backup tool that can be used for remote synchronization, supporting local duplication, or for synchronization with other Secure Shell (SSH), Rsync hosts.

The Rsync event encapsulation module 53 can be used to encapsulate and generate tasks based on the monitored Rsync events. Specifically, the Rsync event encapsulation module 53 may monitor Rsync events such as a file uploaded by the client using Rsync. When an Rsync event is monitored, the task can be encapsulated and generated, and can further be recorded in a log.

The task submission module 54 can be used to transmit the generated task to the scheduling server.

Figure 6:
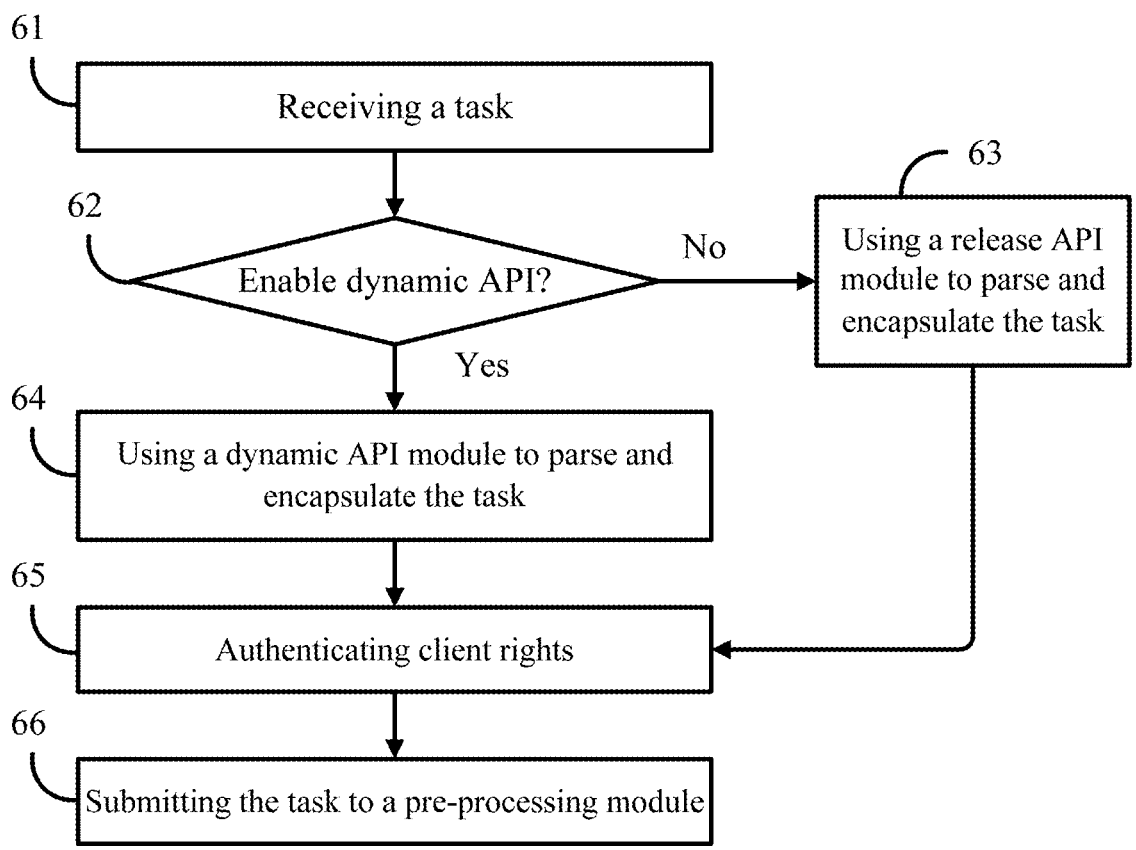
FIG. 6 illustrates a schematic flowchart showing processing of a task received by a scheduling server in a file delivery system in accordance with some embodiments of the present disclosure.

Referring to FIG. 6, FIG. 6 illustrates a part of working flowchart of an exemplary a scheduling server when receiving a task. The scheduling server can receive a task, parse and verify the task, and then transfer the task to the task pre-processing module.

At step 61, a task can be received. For example, a client-submitted task, such as a file synchronization request, may be received.

At step 62, whether the dynamic API is to be enabled is determined. For example, whether to enable the dynamic API can be determined based on the configuration of the client.

If a determination result is No at step 62, that is, the dynamic API is not to be enabled, step 63 is applied. Ate step 63, the release API module is used to parse the task directly, and the parsing result can be encapsulated as a task object. In other words, without enabling the dynamic API, the generic API protocol can be used to parse the task.

If the determination result Yes at step 62, that is, the dynamic API is to be enabled, step 64 is applied. At step 64, the dynamic API module is used to parse the task, and encapsulate the parsing result as the task object. In other words, under a situation where the dynamic API is enabled, the task can be parsed using the dynamic API protocol, such as an API protocol defined by pre-configured Groovy script.

At step 65, the client's right can be authenticated. For example, it can be determined whether a client has the authority to perform the submitted task. A non-limiting example is about whether a client has a permission to download files to a certain distributed file storage cluster.

At step 66, the task can be submitted to the pre-processing module for subsequent processing.

Figure 7:
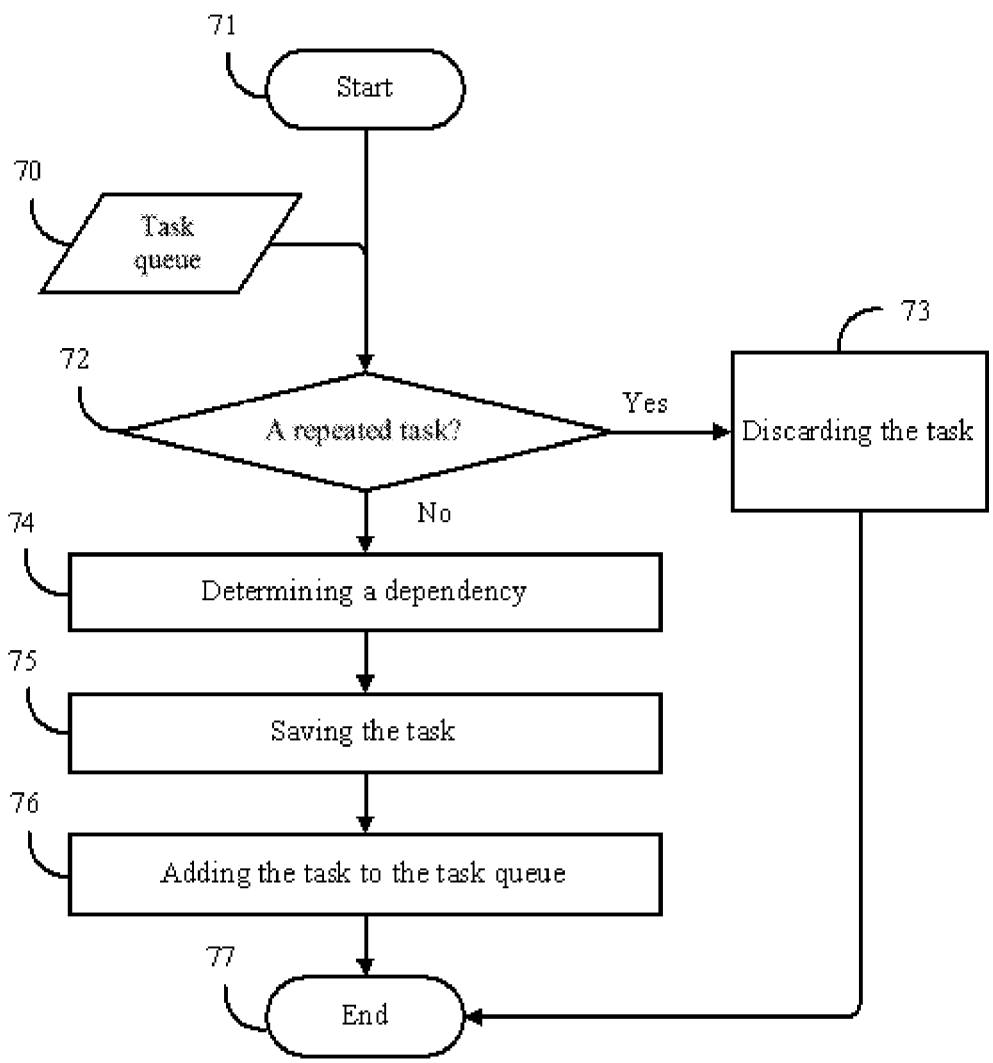
FIG. 7 illustrates a schematic working flowchart of an exemplary task pre-processing module in a file delivery system in accordance with some embodiments of the present disclosure.

Referring to FIG. 7, FIG. 7 illustrates a working flowchart of an exemplary task pre-processing module. The task pre-processing module is primarily used to determine whether there is a repeated task, and to filter or discard the repeated task.

The process can start at step 71.

At step 72, it can be determined whether there is a repeated task. For example, based on the existing task queue, it can be determined whether a newly received task is the same as a previous task.

If the determination result Yes at step 72, that is, there is a repeated task, the process can go to step 73 where the repeated task is discarded.

If the determination result No at step 72, that is, there is no repeated task, the process can go to step 74 where a dependency of the newly received task on the previous tasks is determined. For example, whether the current task depends on other task(s) may be determined based on the file path relationships that the task directs to.

At step 75, the task can be saved.

At step 76, the task can be saved to the task queue.

The process can end at step 77.

In one embodiment, file locks can be used to limit and determine dependencies between tasks. Further, the dependencies between tasks can be restricted by performing a locking and/or unlocking operation on the files or directories to which the tasks are directed.

Each file or directory has an independent read lock and an independent write lock. The locking and unlocking operations can be performed using the following approach.

Locking operation: For all parent directories in the file path of the file or directory to which the task is directed, the corresponding read lock indexes are respectively incremented by 1. And for the final file or directory to which the task is directed, the corresponding write lock is incremented by 1.

Unlocking operation: For all parent directories in the file path of the file or directory to which the task is directed, the corresponding read lock indexes are respectively decremented by 1. And for the final file or directory to which the task is directed, the corresponding write lock index is decremented by 1.

For example, the file lock of an original folder a/b/c can be: /a(00)/b(00)/c(00). The content in each bracket is a file lock, where the first digit represents the read lock, and the second digit represents the write lock. The present disclosure is however not limited thereto.

(1.) Task A is to rename the folder of a/b/c. After a locking operation, the status of the file lock is as follows:

/a(10)/b(10)/c(01)

/a(10)/b(10)/f(01)

(2.) Task B is to rename the file from /a/b/c/d.txt to /a/b/c/e.txt. After a locking operation, a result of locking is as follows:

/a(20)/b(20)/c(11)/d.txt(01)

/a(20)/b(20)/c(11)/e.txt(01)

(3.) Task C is to rename the folder b into folder h. After a locking operation, a result of locking is as follows:

/a(30)/b(21)/c(11)

/a(30)/h(01)/c(11)

(4.) Task A is successfully implemented. A result of unlocking is as follows:

/a(20)/b(11)/c(10)

(5.) Task B is successfully implemented. A result of unlocking is as follows:

/a(10)/b(01)/c(00)/d.txt(00)

/a(10)/b(01)/c(00)/e.txt(00)

(6.) Task C is successfully implemented. A result of unlocking is as follows:

/a(00)/b(00)/c(00)

/a(00)/h(00)/c(00)

Whether a task depends on other tasks can be determined by the file lock status of the file or directory. Specifically, the determination can be made following the steps below.

(1) The lock status of the parent path of a file or directory that is to be operated on by the current task is determined.

If a directory of the parent has a write lock, all tasks that operate on the parent directory are added to a dependent queue of the current task.

(2) The lock status of the final file or directory that is to be operated on by the current task can be determined. If the target file or directory has a write lock, all tasks that operate on the target file or directory can be added to the dependent queue of the current task.

(3) A locking operation can be performed on the file or directory to which the operation is directed.

For example, in an application scenario, a current lock status of the file /a/b/c/d.txt is: /a(10)/b(10)/c(00)/d.txt(00).

A currently received task is a renaming task A: a/b→a/f. That is, a/b is to be renamed as a/f.

Firstly, according to the above-mentioned step (1), it can be determined that the folder a only has a read lock. Thus, there is no dependency relationship, and no operation is required.

Secondly, according to the above-mentioned step (2), it can be determined that the folder b has a write lock. Thus, all tasks associated with the operation on the folder b can be added to a dependency task queue of the task A.

Then, according to the above-mentioned step (3), the lock status of the folder after a locking operation is: /a(10)/b(11)/c(00)/d.txt(00).

A next received task is an uploading task B: a/b/c/e.txt. In other words, the file e.txt does not exist originally, and the current uploading task B is to upload the file e.txt.

Firstly, according to the above-mentioned step (1), it can be determined that the folder a only has a read lock, and no processing is thus required for folder a. It also can be determined that the folder b has a write lock. Thus, all tasks associated with the write lock operation on folder b can be added to a dependency task queue of the task B. It also can be determined that the folder c does not have a lock. Thus, no processing is required for folder c.

Secondly, according to the above-mentioned step (2), it can be determined that the final file e.txt to be operated by the task B does not have a lock. Thus, no processing is required for the final file e.txt.

Finally, a locking operation can be performed on the final file e.txt that is operated on by the current task B.

Accordingly, the disclosed task dependency relationship can be mainly calculated based on the file lock status, so that multiple tasks can be correctly executed when multiple clients concurrently perform the multiple tasks.

Figure 8:
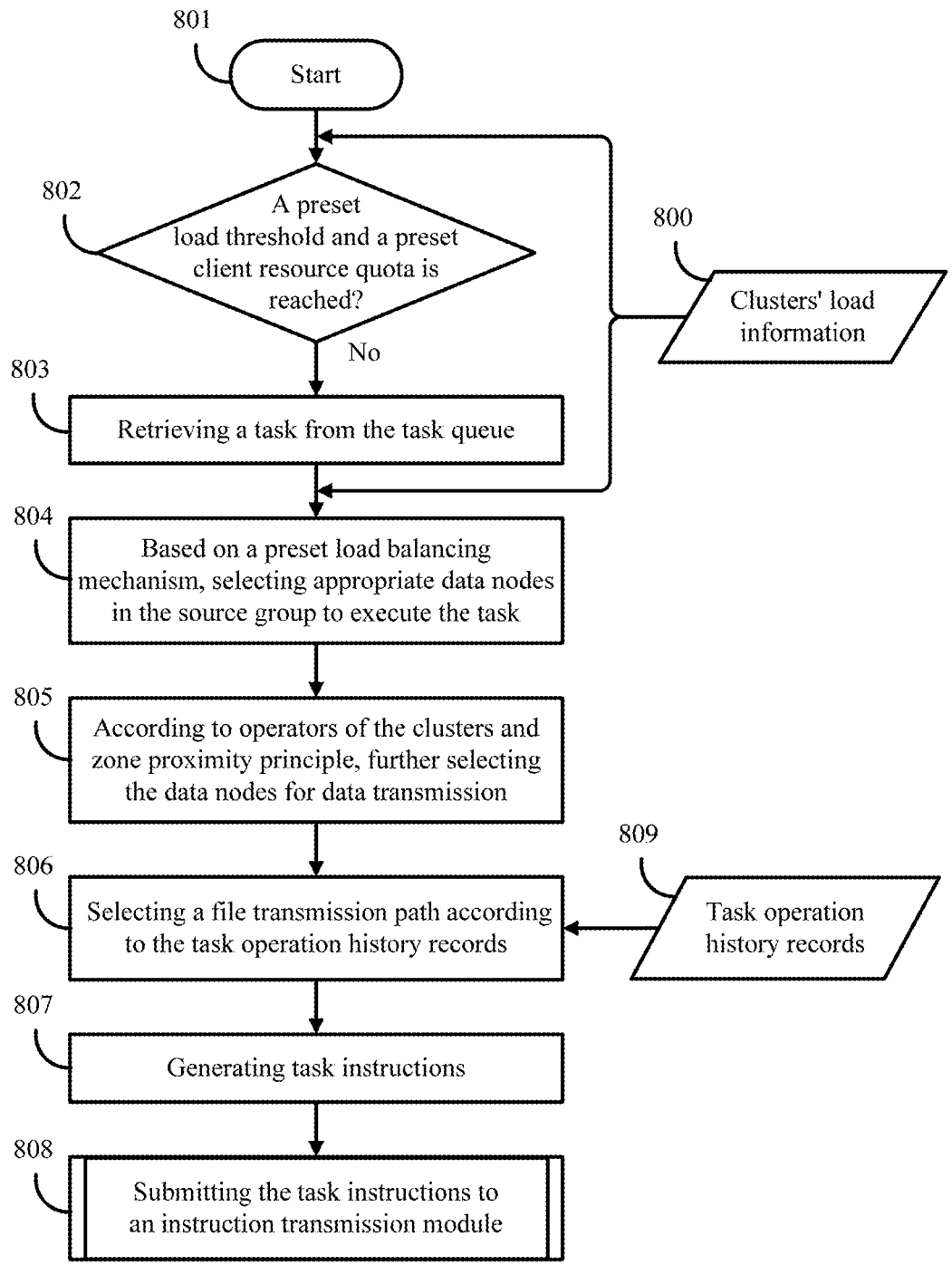
FIG. 8 illustrates a schematic flowchart showing task scheduling by a scheduling server in a file delivery system in accordance with some embodiments of the present disclosure.

Referring to FIG. 8, FIG. 8 illustrates a schematic working flowchart of an exemplary task scheduling module in a scheduling server.

As illustrated, the task scheduling can start at step 801.

At 802, it can be determined whether a preset load threshold and a client resource quota are reached. The client resource quota can be referred to the resources that the clients can use, such as the distributed file storage clusters that are available to the clients, the storage space that are available to the clients, and the data synchronization bandwidth that are available to the clients. If the clusters' load information 800 indicates that the current load does not reach the preset load threshold and there is a cluster or data node available in the client resource quota, it is indicated that the current task can be executed or distributed.

At step 803, a task can be retrieved from the task queue.

At step 804, appropriate data nodes are selected from the source group based on a preset load balancing mechanism or algorithm, to execute a task.

At step 805, appropriate data nodes are selected for data transmission according to the operators of the clusters and the zone proximity principle. That is, a file transmission path can be initially determined. In general, data nodes belonging to the same operator and/or having the nearest physical distances in the cluster can be selected in priority for data transmission. The zone proximity principle or the nearest physical distance principle can be optional. Usually, the determination of the file transmission path can be initially made merely based on the respective operators.

At step 806, the file transmission path can be further selected according to the task operation history record 809. For example, there may still be multiple alternative file transmission paths, as determined by the operators of the clusters and the zone proximity principle. Under this situation, the file transmission path may be further selected based on the task operation history records 809. Further, the file transmission mode can also be determined based on the task operation history records 809. For example, it can be determined whether a proxy server or a user datagram protocol (UDP) can be used for file transmission, in order to further increase the transmission speed.

At step 807, task instructions can be generated.

At step 808, the generated task instructions can be submitted to the instruction transmission module.

Figure 9:
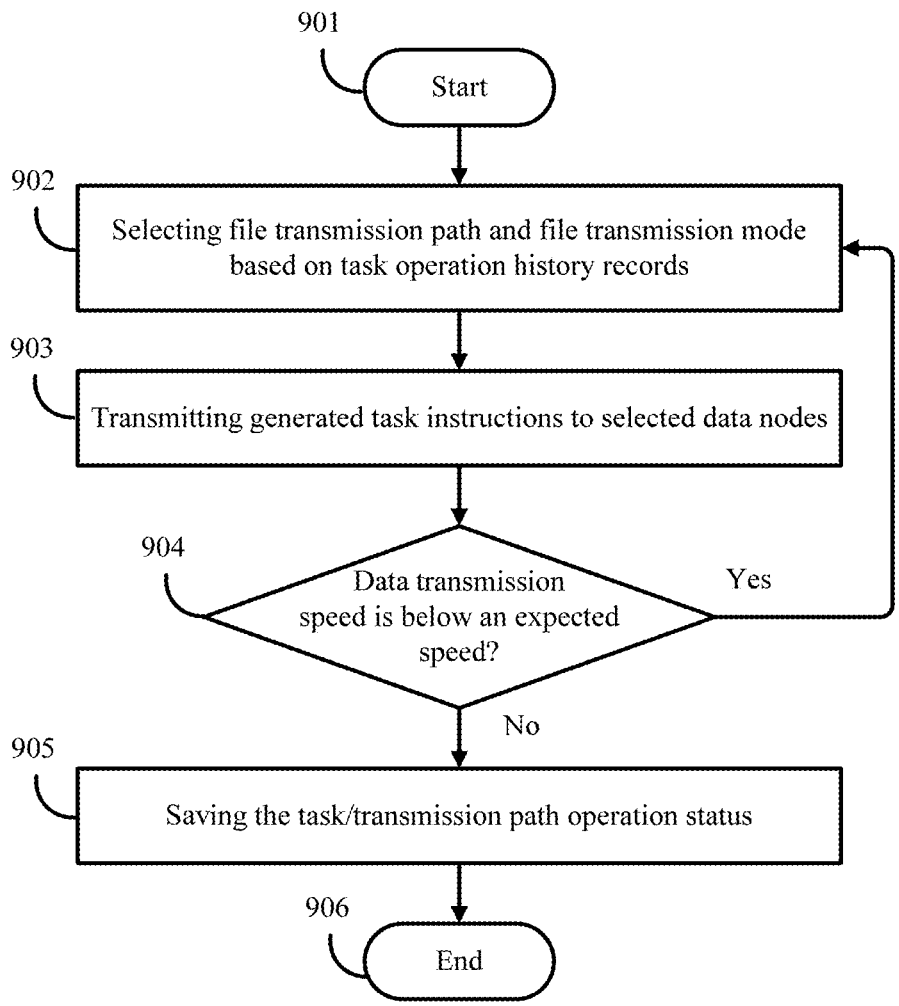
FIG. 9 illustrates a schematic flowchart of an exemplary route selection process by a scheduling server in a file delivery system in accordance with some embodiments of the present disclosure.

Referring to FIG. 9, FIG. 9 illustrates an approach to determine a desired file transmission path based on the task operation history record. As illustrated, the process can start at step 901.

At step 902, the file transmission path and the transmission mode can be selected based on the task operation history records. The transmission mode may be, for example, whether to use a proxy server or a UDP protocol for transmission.

On the selection of the file transmission path, a data transmission speed of each path can be first calculated. The data transmission speed of a path can be an average of the data transmission speeds of multiple tasks. More specifically, the task operation history records can record the task operation performance of each data node in a short recent term, such as in the most recent day. The data transmission speed of a path S can be calculated using the following approach: $Avg(S)=(S1\ S2\ \ldots\ Sn)/n$, where $Avg(S)$ is the data transmission speed of the path S, and $S1, S2, \ldots, Sn$ are the data transmission speeds of the path S in multiple tasks respectively in the short recent term.

As a non-limiting example, if the load of the source data nodes or target data nodes on a path is larger than a preset load threshold Pmax, the path can be excluded. If the load of the source data nodes or target data nodes on a path is less than a preset load threshold Pmin, the data transmission speed of the path cannot be attenuated. In other cases, the data transmission speed can be attenuated according to the load. The attenuation ratio can be proportional to the load, and the data transmission speed of the path can be weighted according to the attenuation ratio. For example, the attenuation ratio can be determined according to the following table:

| Diff_Load | Attenuation ratio (Dload) |
|---|---|
| 0-10% | 0 |
| 20-30% | 15% |
| 30-50% | 20% |
| 50-100% | 30% |
| >100% | 70% |

Diff_Load indicates the loads of a path A and a path B, e.g., the summation of the loads of each data node on the paths.

After that, the weighted values of the data transmission speeds of different paths based on the attenuation ratios can be compared. For example, for the path A and the path B, Avg(SA)*DloadA and Avg(SB)*DloadB can be compared to select the desired path. Avg(SA) is the data transmission speed of path A, and DloadA is the attenuation rate of path A. Avg(SB) is the data transmission speed of path B, and DloadB is the attenuation ratio of path B. The data transmission speed of a path may be, e.g., an average value, or a minimum value, or any other suitable value of the data transmission speed of each data node on the path.

After the file transmission path and the file transmission mode have been determined, the process can go to step 903 to generate task instructions, and to transmit the generated task instructions to the selected data nodes to perform the task or to distribute the task.

At step 904, whether the data transmission speed is below an expected speed is monitored. For example, during file transmission, if the data transmission speed is found to be less than the expected speed, e.g., 5 MB/s and the file transmission progress is less than a preset threshold, e.g., 70%, the file transmission can be terminated. The process can go back to step 902 to re-select a file transmission path. If the data transmission speed is higher than the expected speed, when the file transmission is completed, e.g., after the file download is completed, the proceed can go to step 905 to save the task operation status to the task operation history records, which can be used for reference in the subsequent selection of file transmission path.

The process can end at step 906.

Figure 10A:
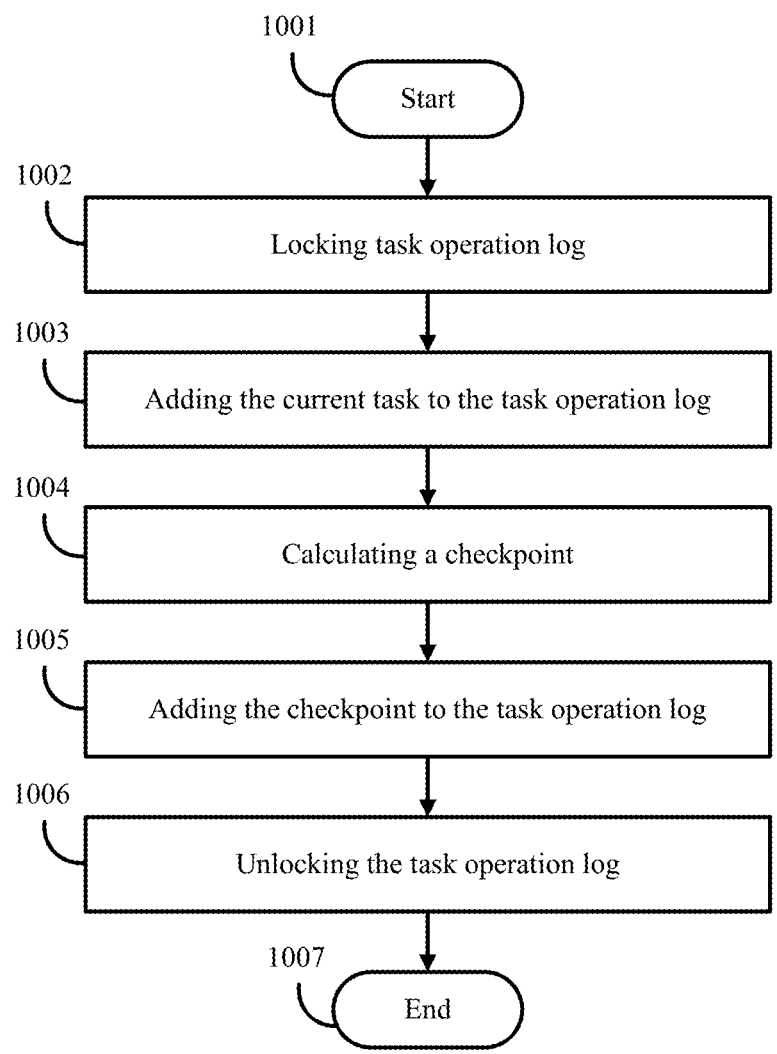
FIGS. 10A and 10B illustrate schematic working flowcharts of a failure recovery module in a scheduling server of a file delivery system in accordance with some embodiments of the present disclosure.
Figure 10B:
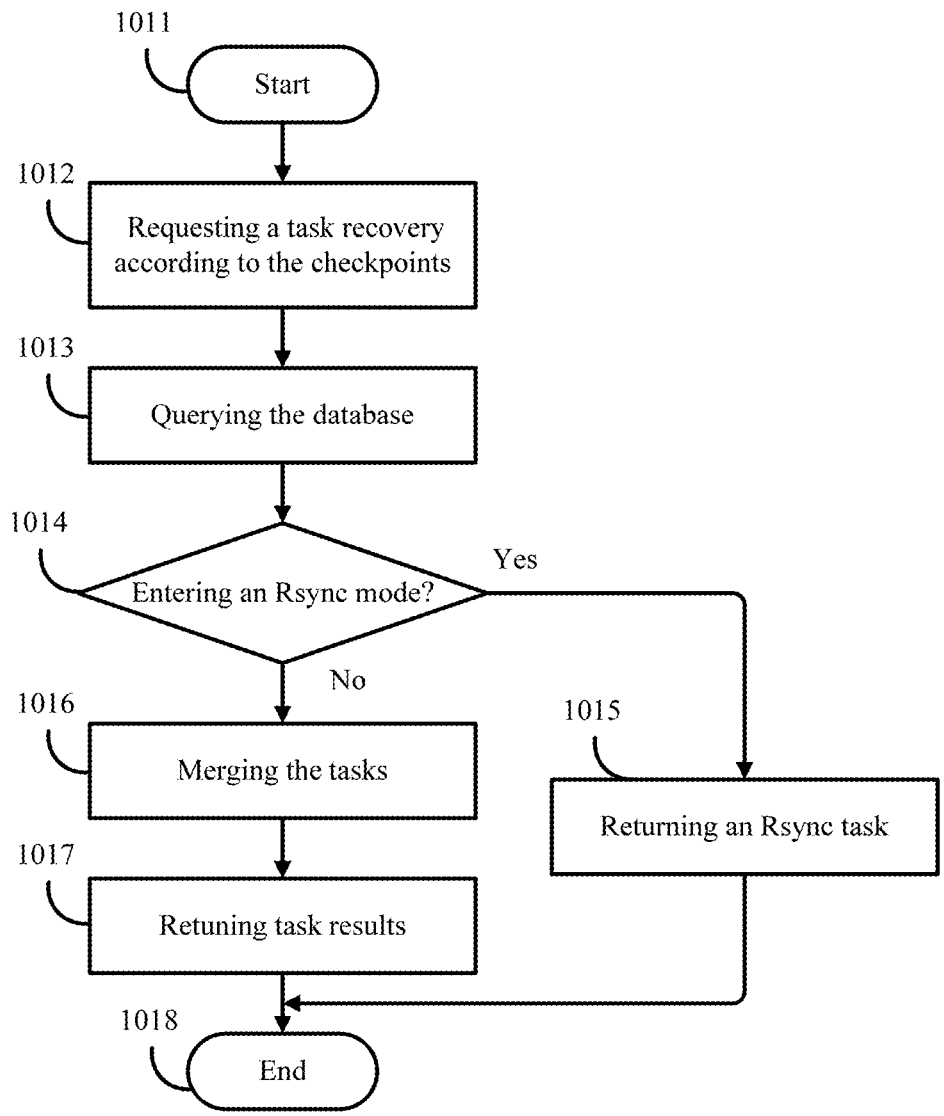

Referring to FIGS. 10A and 10B, working flowcharts of a failure recovery module are illustrated. In the distributed file storage clusters that belongs to a same source group, if a failure occurs, e.g., when an engine room failure or a network problem occurs, a failure recovery process needs to be started. For example, a task may be recorded and checkpoints can be configured during the task execution process. After a failure occurs, the task succeeding the latest saved checkpoint can be restored.

For each distribution file storage cluster, a task operation log for each client can be saved. The file name for the task operation log can be, for example, customer_task.log. The file format of the task operation log can be a triplet such as [TaskID, TaskType, checkpoint]. Each client's TaskID can be an ordered self-increment ID. TaskType is a task type, and checkpoint can mark whether the task ID is a checkpoint. An specific example is as follows:

1, Upload
2, Upload
3, Decompress
4, Upload, Chk
6, Delete
7, Upload

Where Chk is a checkpoint mark.

In the following, illustrations are provided referring to the above example and FIG. 10A. As shown, the process can start at step 1001.

At step 1002, when the most recent task 5 is completed, the task operation log can be locked.

At step 1003, the current task can be added to the task operation log. The resulted task operation log can be as follows:

1, Upload
2, Upload
3, Decompress
4, Upload, Chk
6, Delete
7, Upload
5, Upload

At step 1004, a checkpoint can be calculated.

At step 1005, the calculated checkpoint can be added to the task operation log.

With respect to the checkpoint calculation, whether there are consecutive TaskIDs can be analyzed succeeding a previous checkpoint, and the largest continuous TaskID can be marked as a checkpoint. For example, in the above example, after calculating and adding a checkpoint, the task operation log is:

1, Upload
2, Upload
3, Decompress
4, Upload, Chk
6, Delete
7, Upload, Chk
5, Upload That is, task 7 is marked as a checkpoint.

At step 1006, the task operation log can be unlocked.

The process can end at step 1007.

When the clusters are recovered from a failure, the tasks following each client's checkpoint can be recovered based on the task operation log. In the example above, all tasks after task 7 can be queried and recovered.

Referring to FIG. 10B, a flowchart of task recovery is shown. The process can start at step 1011.

At step 1012, task recovery is requested according to the checkpoints.

At step 1013, a database can be queried to acquire the total number of tasks.

At step 1014, it can be determined whether an Rsync mode is entered, depending on whether the duration of the failure exceeds a specified period of time, or whether the number of tasks waiting to be recovered exceeds a specified number.

If a determination result is Yes at step 1014), the process can go to step 1015 to enter the Rsync mode and return an Rsync task. The Rsync mode can be used for massive data transmission and recovery, especially suitable for use under situations where the number of tasks needs to be recovered is relatively high.

If the determination result is No at step 1014, the process can go to step 1016 to merge the tasks, and further go to step 1017 to return a task result.

The process can end at step 1018.

Figure 11:
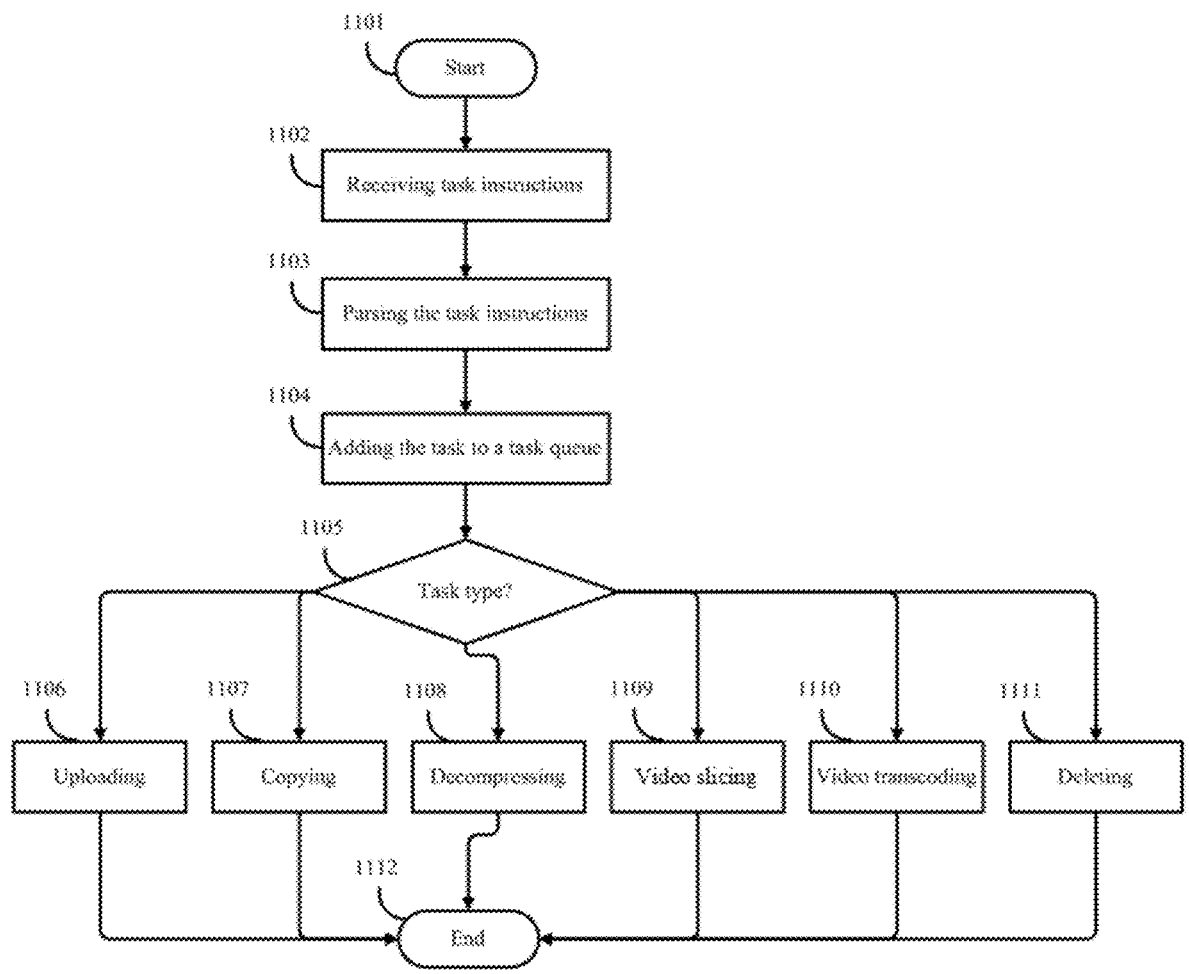
FIG. 11 illustrates a schematic working flowchart of an exemplary file delivery client in a file delivery system in accordance with some embodiments of the present disclosure.

Referring to FIG. 11, FIG. 11 illustrates a working flowchart of an exemplary file delivery client in accordance with some embodiments of the present disclosure.

As illustrated, the process can start at step 1101.

At step 1102, task instructions sent by the scheduling server can be received.

At step 1103, the task instructions can be parsed. For example, the task instructions can be parsed based on a preset protocol.

At step 1104, the parsed task can be added to the task queue.

At step 1105, a type of the task can be determined.

At step 1106, if the task is an uploading task, the target file can be downloaded from the specified source, and the download progress can be reported to the scheduling server regularly. After the download is complete, the message digest 5 (MD5) value of the file can be verified to ensure the consistency of the file.

If the task is a deletion task, at step 1111, the specified file can be deleted, and the result can be fed back.

If the task is a transcoding task, at step 1110, transcoding is executed, for example, video transcoding can be performed.

If the task is a decompression task, at step 1108, decompressing is executed, for example, a corresponding decompression tool can be called to perform decompression.

If the task is a slicing task, at 1109, slicing is executed, for example, video slicing can be performed.

If the task is an image processing task, image processing can be performed, and the result can be fed back.

If the task is a copying task, at step 1107, copying can be performed.

If the task is an Rsync task, the Rsync instructions can be called.

It should be noted that, the above types of tasks are merely examples, and the present disclosure is not limited thereto. For example, the types of task may also include renaming, creating a directory, video format conversion, and file verification, etc.

Figure 12:
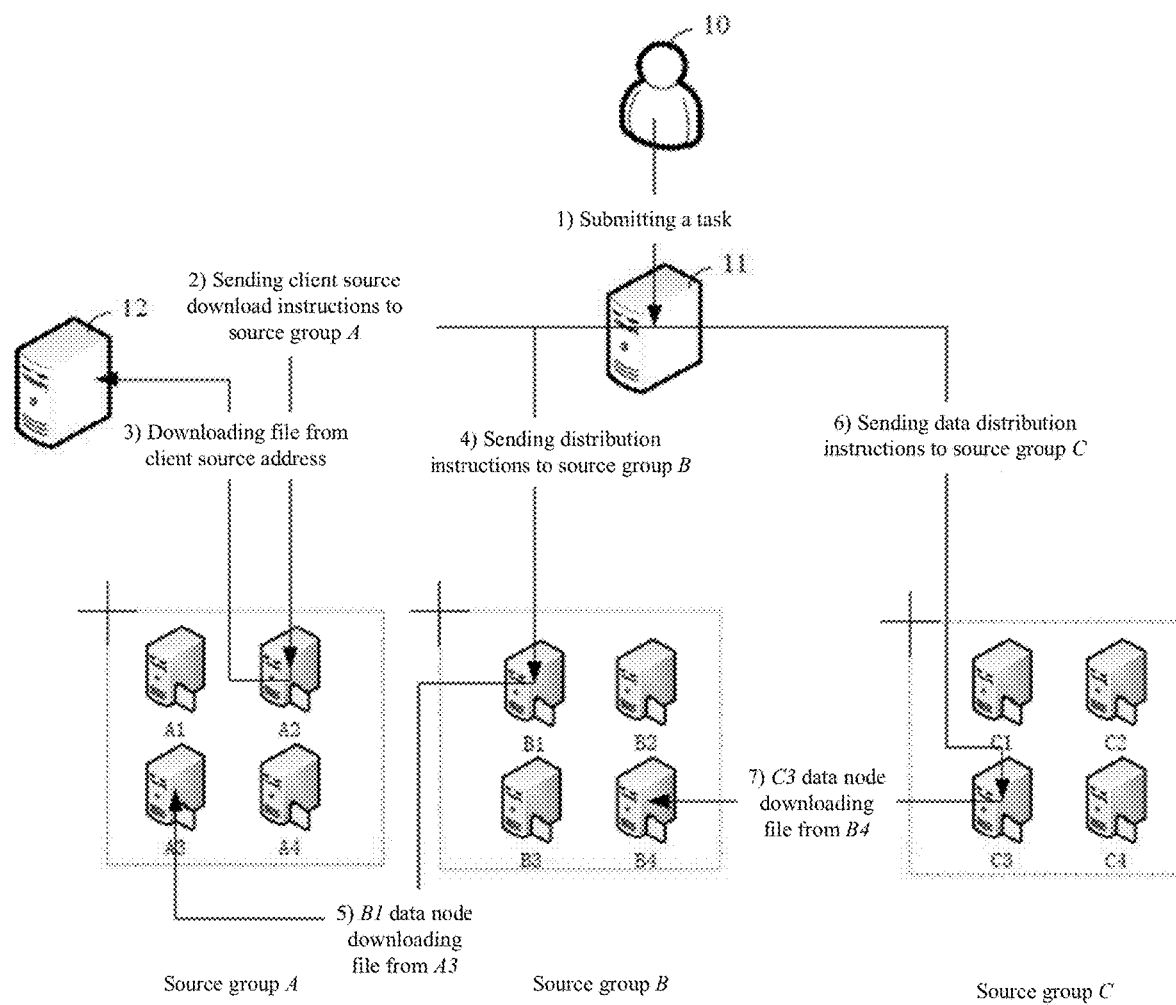
FIG. 12 illustrates a schematic diagram of data transmission when a file delivery system executes a task issued by a client in accordance with some embodiments of the data transmission.

Referring to FIG. 12, FIG. 12 illustrates a schematic diagram showing data transmission of a file delivery system when a task is uploaded through an API mode. During the distribution process of a file uploaded by a client 10, an application program interface (API) mode can be used to submit the task to the scheduling server. The parameters of the task, such as the file source download address, the path for storing the file, can be informed to the scheduling server 11. The scheduling server 11 can perform scheduling according to the corresponding parameters, and can instruct appropriate distributed file storage clusters to perform task distribution.

Detailed descriptions are provided hereinafter with reference to FIG. 12, where FIG. 12 illustrates multiple distributed file storage clusters within the same source group, including cluster A, cluster B, and cluster C. The cluster A includes data nodes A1 to A4, the cluster B includes Data nodes B1 to B4, and the cluster C includes data nodes C1 to C4. However, the present disclosure is not limited thereto.

First, the client 10 can submit a task to the scheduling server 11. For example, the client 10 can submit a task by using the API mode, where the API mode can be either a generic release API or a client-customized dynamic API.

The scheduling server 11 can then select appropriate data nodes to perform the task according to the load information of each data node. For example, based on a preset load balancing algorithm, the data node A2 in the cluster A can be selected to download a file from the client source 12 specified by the client 10. The task instructions can be sent to the selected data node A2. Specifically, the task instructions are download instructions.

The data node A2 can download the file from a client-specified download address, e.g., http://www.a.com/mp4/a.mp4, and can store the target file to a specified path, e.g., /data/test/mp4/a.mp4. Upon completion of the file download, the message digest 5 (MD5) or Secure Hash Algorithm (SHA) provided by the client 10 can be used to check the consistency of the file. In addition, during the downloading process, the file delivery client on the data node A2 may feedback the progress of the task to the scheduling server 11, and can feedback the final execution result of the task. Since multiple data nodes within a cluster can share storage, the file downloaded to the data node A2 are also available to other data nodes within the cluster A.

When the scheduling server 11 receives the feedback from the data node A2 indicating that a task is completed, the scheduling server 11 performs the task scheduling according to the parameters such as the operators of each cluster, and the load information of each data node. The path of the task distribution is selected to be from the data node A3 of the cluster A to the data node B1 of the cluster B. The corresponding task instructions can be transmitted to the data node A3 and/or the data node B1. The current task instructions are distribution instructions.

In addition, the scheduling server 11 can select the appropriate transmission mode based on whether the operation is performed across operators and the task operation history record. For example, the scheduling server 11 may determine whether to use the UDP protocol or use a proxy server to transmit data between the data node A3 and the data node B1. Assuming the operator remains the same, the data node B1 can download a file from the data node A3, and the download address can be, for example, http://A3/test/mp4/a.mp4.

During the execution of a distribution task, the data node B1 may feedback the execution progress to the scheduling server 11. Upon completion of the task, the data node B1 may also feedback to the scheduling server 11 indicating that the file has been downloaded.

Thereafter, the scheduling server 11 may select data nodes and a corresponding transmission path based on parameters including load information, operators, task operation history record, and send task instructions to the cluster C. The current task instructions can be still distribution instructions. For example, the data node C3 may be instructed to download a file from the data node B4, and the download address may be http://B4/test/mp4/a.mp4.

Figure 13:
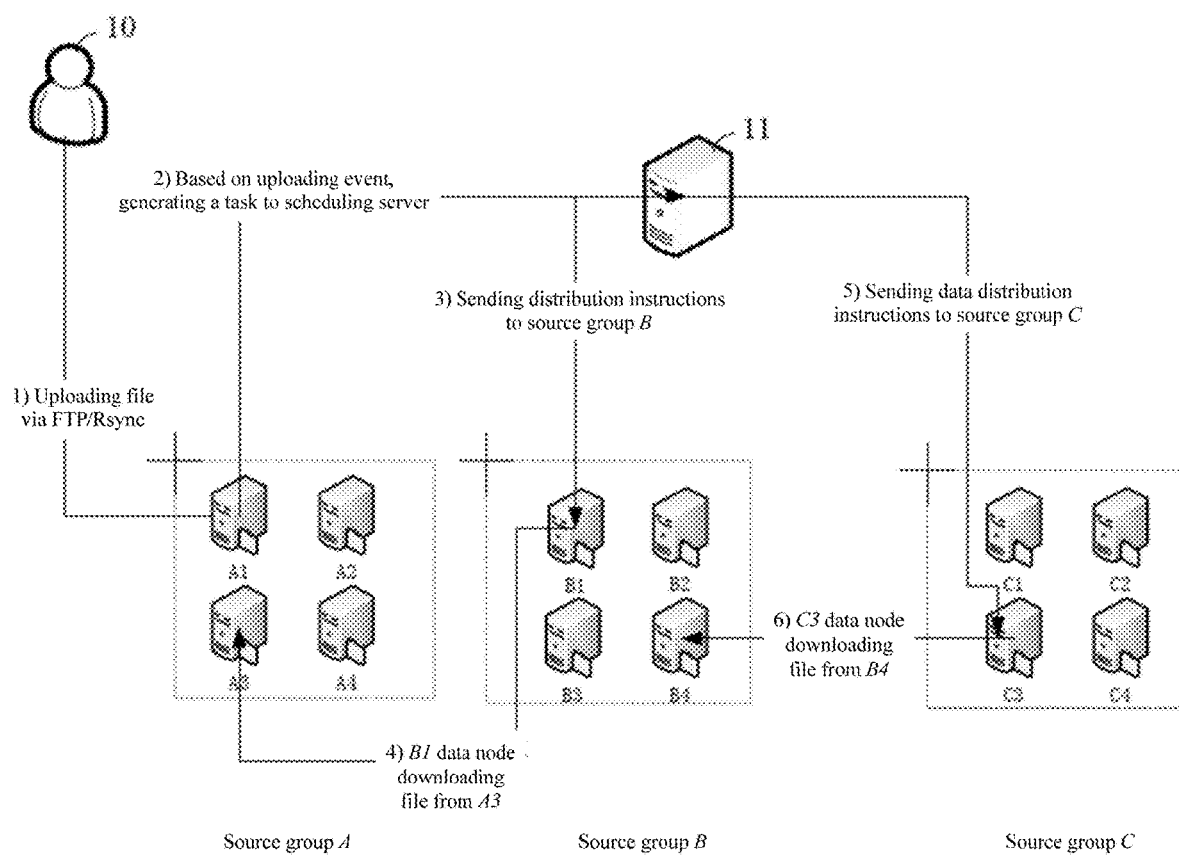
FIG. 13 illustrates a schematic flow diagram of data transmission when a file delivery system executes a task issued by a data node in accordance with some embodiments of the data transmission.

Referring to FIG. 13, FIG. 13 illustrates a schematic view showing data transmission of a file delivery system when a file is uploaded through a FTP or Rsync mode.

During the distribution process of a file uploaded by the client 10, the client 10 can upload the file to data nodes by using mode of FTP or Rsync. The FTP server or the Rsync server in a data node can submit a task to the scheduling server 11 using the API mode when an upload event is monitored. The scheduling server 11 may perform scheduling based on the corresponding parameters to instruct the appropriate distributed file storage cluster to distribute the task.

Detailed descriptions are provided hereinafter with reference to FIG. 13, where FIG. 13 shows multiple distributed file storage clusters in a same source group, including cluster A, cluster B, and cluster C. The cluster A includes data nodes A1 to A4, the cluster B includes Data nodes B1 to B4, and the cluster C includes data nodes C1 to C4. The present disclosure is, however, not limited thereto.

First, the client 10 can upload a file to the data node A1 via the FTP or Rsync mode. For example, a file a.mp4 can be uploaded to the address /data/test/mp4/a.mp4.

The FTP server or the Rsync server on the data node A1 can generate a task according to the upload event, and can submit the task to the scheduling server 11.

After receiving the task, according to the operators of each cluster, the load information, the task operation history record, etc., the scheduling server 11 can schedule the task, and select the data node B1 in the cluster B to download a file from the data node A3 in the cluster A. In addition, according to the operators, the task operation history record, the network situation, and other parameters, it can be determined whether the UDP protocol, a proxy server, and/or other special transmission mode can be used. Assuming that the operator remains the same, the data node B1 can download the file from the data node A3, and the download address may be, for example, http://A3/test/mp4/a.mp4.

Upon completion of the download by the data node B1, a feedback may be sent to the scheduling server 11. Based on the received feedback, the scheduling server 11 can send task instructions to the cluster C based on the result of the task scheduling. The task instructions can be distribution instructions that instruct the data node C3 to download a file from the data node B4.

After receiving the task instructions, the data node C3 may download the file from the data node B4. For example, the file can be downloaded from the address http://B4/test/mp4/a.mp4. Upon completion of the download, the data node C3 may send a feedback to the scheduling server 11.

FIGS. 12 and 13 respectively show examples in which a client sends a task directly to a scheduling server, and a data node is triggered by an upload event to send a task to a scheduling server. However, it should be noted that, the ways for the client to send a task is not limited thereto. For example, a client can issue a task to the scheduling server through a generic release API, a custom dynamic API, or other manners. A data node can generate a task based on other types of events, such as deletion and copy.

Another aspect of the present disclosure provides a distributed storage-based file delivery method. The method can include the following steps.

The scheduling server can perform task scheduling according to the received task, and can generate task instructions according to the operators of the distributed file storage clusters and the load information of data nodes. The task can be sent by a client or sent by a data node.

The data nodes to which the task instructions are directed can execute the task and/or perform task distribution according to the task instructions, so that data in all distributed file storage clusters within a same source group can remain synchronized. The source group can include multiple distributed file storage clusters, and each distributed file storage cluster can include multiple data nodes.

A process of task scheduling may include: receiving and parsing the task; collecting load information of data nodes within all distributed file storage clusters; based on the operators of the distributed file storage clusters and the load information of the multiple data nodes, selecting qualified data nodes from a plurality of data nodes for executing the task and/or performing the task distribution, and generating task instructions; and forwarding the task instructions to the selected data nodes.

More details of the distributed storage-based file delivery method can be referred to the description of the distributed storage-based file delivery system described above, which are not repeated herein.

Although the invention has been described and illustrated in the foregoing illustrative embodiments, the present disclosure is not intended to limit the invention. Without departing from the spirit and scope of the disclosed subject matter, possible modifications or improvements to the disclosed subject matter are understandable to those skilled in the art and are intended to be encompassed within the scope of the present disclosure, which is only limited by the claims which follow.

What is claimed is:

1. A distributed storage-based file delivery system, comprising:
    a scheduling server including a processor;
    at least one source group, wherein each source group include a plurality of distributed file storage clusters, and each distributed file storage cluster include a plurality of data nodes each including a processor;
    wherein the processor of the scheduling server is configured to, based on a received task and according to operators of the distributed file storage clusters and load information of each data node of the plurality of data nodes, perform task scheduling that includes calculating dependencies between different tasks and generating task instructions according to the dependencies between different tasks such that in the cases where multiple tasks are concurrently existing, the consistency of the files can be ensured, and the task is sent by a client or a data node of the plurality of data nodes;
    processors of data nodes of the plurality of data nodes and to which the task instructions are directed are configured to execute the task and/or perform task distribution according to the task instructions, such that data within all distributed file storage clusters in a same source group remains synchronized;
    wherein the processor of a data node of the plurality of data nodes is configured for synchronizing service configuration information of the client to the scheduling server and saving the service configuration information of the client to a configuration file; and
    wherein the processor of the scheduling server determines the dependencies between different tasks using a following approach:
        determining a lock status of a parent path of a target file or a target directory that is to be operated on by a current task, if a directory of the parent path has a write lock, adding all tasks that operate on the directory to a dependent queue of the current task;
        determining a lock status of the target file or the target directory that is to be operated on by the current task, if the target file or the target directory has a write lock, adding all tasks that operate on the target file or the target directory to the dependent queue of the current task;
        performing a locking operation on the target file or the target directory that is to be operated on by the current task; and
        after completing the current task, performing an unlocking operation on the target file or the target directory;
    wherein the locking operation includes:
        for all parent directories of the target file or the target directory to which the locking operation is directed, incrementing corresponding read lock indexes by 1, and
        for the target file or the target directory to which the locking operation is directed, incrementing a corresponding write lock index by 1; and
    the unlocking operation includes:
        for all parent directories of the target file or the target directory to which the unlocking operation is directed, decrementing corresponding read lock indexes by 1, and
        for the target file or the target directory to which the locking operation is directed, decrementing a corresponding write lock index by 1.

2. The system of claim 1, wherein the processor of the scheduling server is further configured for:
    receiving and parsing the task;
    collecting load information of the data nodes in all distributed file storage clusters;
    obtaining the task, and selecting qualified data nodes from the plurality of data nodes, based on the operators of the distributed file storage clusters and the load information of the plurality of data nodes, to execute the task and/or perform the task distribution, and to generate the task instructions; and transmitting the task instructions to the selected data nodes.

3. The system of claim 2, wherein the processor of the scheduling server is further configured for:

determining whether the task is able to be executed and/or distributed according to the operators of the distributed file storage clusters and the load information of each data node;

selecting a data node to perform the task according to the load information if the task is able to be executed;

based on the operators of the distributed file storage clusters, the load information of the data nodes, and task operation history records of the data nodes, selecting a file transmission path if a task is able to be distributed, wherein the file transmission path include a set of data nodes for task distribution and a transmission order between each data node; and generating the task instructions according to output results.

4. The system of claim 3, wherein the processor of the scheduling server is further configured for, based on the operators of the data nodes, instructing a plurality of data nodes on the file transmission path to select different transmission protocols for data transmission, thereby optimizing a transmission efficiency.

5. The system of claim 2, wherein the processor of the scheduling server is further configured for:

adapting a client-customized dynamic API; and receiving and validating the task, determining whether to enable the dynamic API, in response to the dynamic API being not enabled, parsing the task directly, and in response to the dynamic API being enabled, using the dynamic API to parse the task.

6. The system of claim 2, wherein the processor of the scheduling server is further configured for performing at least one of the following operations:

filtering repeated tasks before obtaining the task;

managing a life cycle of the task, calculating an execution progress of the task, and/or performing time-out management on execution of the task;

feeding back a completion result of the task; and providing failure recovery for the plurality of distributed file storage clusters within a same source group.

7. The system of claim 1, wherein a data node is configured with a file delivery client, wherein the processor of the data node is configured for:

receiving and parsing the task instructions sent by the scheduling server to obtain the task;

acquiring the task from the protocol processing module, and executing the task according to a type of the task; and feeding back an execution progress and/or an execution result of the task to the scheduling server.

8. The system of claim 1, wherein the processor of a data node is configured for:

providing a generic file transfer protocol (FTP) service;

encapsulating and generating the task based on a monitored FTP event; and transmitting the task generated based on the monitored FTP event to the scheduling server.

9. A distributed storage-based file delivery method, comprising:

based on a received task and according to operators of distributed file storage clusters and load information of each data node of a plurality of data nodes included in each of the distributed file storage clusters, performing, by a scheduling server, task scheduling that includes calculating dependencies between different tasks and generating task instructions according to the dependencies between different tasks such that in the cases where multiple tasks are concurrently existing, the consistency of the files can be ensured, wherein the task is sent by a client or a data node of the plurality of data nodes;

executing, by data nodes of the plurality of data nodes and to which the task instructions are directed, the task and/or performing, by the data nodes of the plurality of data nodes and to which the task instructions are directed, task distribution according to the task instructions, such that data within all distributed file storage clusters in a same source group remains synchronized, wherein a source group includes a plurality of distributed file storage clusters; and synchronizing service configuration information of the client to the scheduling server and saving the service configuration information of the client to a configuration file by a data node of the plurality of data nodes and on which a file-transfer-protocol (FTP) server and/or a remote-sync (Rsync) server are configured, wherein the processor of the scheduling server determines the dependencies between different tasks using a following approach:

determining a lock status of a parent path of a target file or a target directory that is to be operated on by a current task, if a directory of the parent path has a write lock, adding all tasks that operate on the directory to a dependent queue of the current task;

determining a lock status of the target file or the target directory that is to be operated on by the current task, if the target file or the target directory has a write lock, adding all tasks that operate on the target file or the target directory to the dependent queue of the current task;

performing a locking operation on the target file or the target directory that is to be operated on by the current task; and after completing the current task, performing an unlocking operation on the target file or the target directory;

wherein the locking operation includes:

for all parent directories of the target file or the target directory to which the locking operation is directed, incrementing corresponding read lock indexes by 1, and for the target file or the target directory to which the locking operation is directed, incrementing a corresponding write lock index by 1; and the unlocking operation includes:

for all parent directories of the target file or the target directory to which the unlocking operation is directed, decrementing corresponding read lock indexes by 1, and for the target file or the target directory to which the locking operation is directed, decrementing a corresponding write lock index by 1.

10. The method of claim 9, wherein according to operators of distributed file storage clusters and load information of each data node, performing task scheduling includes:
receiving and parsing the task;
collecting load information of the data nodes in all distributed file storage clusters;
selecting qualified data nodes from the plurality of data nodes, based on the operators of the distributed file storage clusters and the load information of data nodes, to execute tasks and/or perform task distribution, and generate task instructions; and
transmitting the task instructions to the selected data nodes.

11. The method of claim 10, wherein selecting the qualified data nodes from the plurality of data notes to execute the task and/or perform the task distribution includes:
determining whether the task is able to be executed and/or distributed according to the operators of the distributed file storage clusters and the load information of the plurality of data nodes;
selecting a data node to perform the task according to the load information if the task is able to be executed;
based on the operators of distributed file storage clusters, the load information of the data nodes, and task operation history records of the data nodes, selecting a file transmission path if a task is able to be distributed, wherein the file transmission path include a set of data nodes for task distribution and a transmission order between each data node; and
generating the task instructions.

12. The method of claim 11, wherein selecting the qualified data nodes from the plurality of data nodes to execute the task and/or perform the task distribution further includes:
based on the operators of the data nodes, instructing a plurality of data nodes on the file transmission path to select different transmission protocols for data transmission, thereby optimizing a transmission efficiency.

13. The method of claim 10, wherein receiving and parsing the task includes:
configuring a dynamic API module for adapting a client-customized dynamic API;
receiving and validating the task;
determining whether to enable the dynamic API;
in response to the dynamic API being not enabled, parsing the task directly; and
in response to the dynamic API being enabled, using the dynamic API module to parse the task.

14. The method of claim 10, wherein according to operators of distributed file storage clusters and load information of each data node, performing task scheduling further includes at least one of followings:
filtering repeated tasks before the task scheduling module obtains the task;
managing a life cycle of the task, calculating an execution progress of the task, and/or performing time-out management on execution of the task;
feeding back a completion result of the task; and
providing failure recovery for the plurality of distributed file storage clusters within the same source group.

15. The method of claim 9, wherein executing, by the data nodes of the plurality of data nodes and to which the task instructions are directed, the task and/or performing, by the data nodes of the plurality of data nodes and to which the task instructions are directed, the task distribution includes:
receiving and parsing the task instructions sent by the scheduling server to obtain the task;
executing the task according to a type of the task; and
feeding back an execution progress and/or an execution result of the task to the scheduling server.

16. The method of claim 15, wherein the type of the task includes: uploading, deleting, copying, transcoding, decompressing, slicing, image processing, renaming, creating a directory, Rsync task, video format conversion, and file verification.

17. A distributed storage-based file delivery method, comprising:
based on a received task and according to operators of distributed file storage clusters and load information of each data node of a plurality of data nodes included in each of the distributed file storage clusters, performing, by a scheduling server, task scheduling that includes generating task instructions, wherein the task is sent by a client or a data node of the plurality of data nodes; and
executing, by data nodes of the plurality of data nodes and to which the task instructions are directed, the task and/or performing, by the data nodes of the plurality of data nodes and to which the task instructions are directed, task distribution according to the task instructions, such that data within all distributed file storage clusters in a same source group remains synchronized, wherein a source group includes a plurality of distributed file storage clusters; wherein:
according to operators of distributed file storage clusters and load information of each data node, performing task scheduling includes:
receiving and parsing the task,
collecting load information of the data nodes in all distributed file storage clusters,
selecting qualified data nodes from the plurality of data nodes, based on the operators of the distributed file storage clusters and the load information of data nodes, to execute tasks and/or perform task distribution, and generate task instructions, and
transmitting the task instructions to the selected data nodes; and
according to operators of distributed file storage clusters and load information of each data node, performing task scheduling further includes at least one of followings:
filtering repeated tasks before the task scheduling module obtains the task,
managing a life cycle of the task, calculating an execution progress of the task, and/or performing time-out management on execution of the task,
feeding back a completion result of the task, and
providing failure recovery for the plurality of distributed file storage clusters within the same source group; and
according to operators of distributed file storage clusters and load information of each data node, performing task scheduling further includes:
calculating dependencies between different tasks, and
performing task scheduling, by a task scheduling module, according to the dependencies between different tasks; and
the dependencies between different tasks are calculated using a following approach:
determining a lock status of a parent path of a target file or a target directory that is to be operated on by a current task, if a directory of the parent path has a write lock, adding all tasks that operate on the directory to a dependent queue of the current task;
determining a lock status of the target file or the target directory that is to be operated on by the current task, if the target file or the target directory has a write lock, adding all tasks that operate on the target file or the target directory to the dependent queue of the current task;

performing a locking operation on the target file or the target directory that is to be operated by the current task; and after completing the current task, performing an unlocking operation on the target file or the target directory;

wherein the locking operation includes:
- for all parent directories of the target file or the target directory to which the locking operation is directed, incrementing corresponding read lock indexes by 1, and
- for the target file or the target directory, incrementing a corresponding read lock index by 1; and the unlocking operation includes:
- for all parent directories of the target file or the target directory to which the unlocking operation is directed, decrementing corresponding read lock indexes by 1, and
- for the target file or the target directory to which the unlocking operation is directed, decrementing a corresponding read lock index by 1.

* * * * *